(12) United States Patent
Omata et al.

(10) Patent No.: US 9,318,982 B2
(45) Date of Patent: Apr. 19, 2016

(54) CONTROL APPARATUS FOR AC MOTOR

(71) Applicant: DENSO CORPORATION, Kariya, Aichi-pref. (JP)

(72) Inventors: Ryuji Omata, Anjo (JP); Takahumi Oowada, Kariya (JP)

(73) Assignee: DENSO CORPORATION, Kariya (JP)

( * ) Notice: Subject to any disclaimer, the term of this patent is extended or adjusted under 35 U.S.C. 154(b) by 35 days.

(21) Appl. No.: 14/533,469

(22) Filed: Nov. 5, 2014

(65) Prior Publication Data

US 2015/0123581 A1 May 7, 2015

(30) Foreign Application Priority Data

Nov. 5, 2013 (JP) .................................. 2013-229562

(51) Int. Cl.
| | | |
|---|---|---|
| *H02P 6/08* | (2006.01) | |
| *H02P 6/00* | (2006.01) | |
| *B60L 3/00* | (2006.01) | |
| *B60L 3/04* | (2006.01) | |
| *B60L 7/14* | (2006.01) | |
| *B60L 11/00* | (2006.01) | |
| *B60L 11/14* | (2006.01) | |
| *B60L 11/18* | (2006.01) | |
| *B60L 15/02* | (2006.01) | |
| *B60L 15/20* | (2006.01) | |
| *H02P 29/02* | (2006.01) | |

(52) U.S. Cl.
CPC ............... *H02P 6/002* (2013.01); *B60L 3/0038* (2013.01); *B60L 3/04* (2013.01); *B60L 7/14* (2013.01); *B60L 11/005* (2013.01); *B60L 11/14* (2013.01); *B60L 11/1864* (2013.01); *B60L 15/025* (2013.01); *B60L 15/20* (2013.01); *H02P 29/028* (2013.01); *B60L 2210/40* (2013.01); *B60L 2240/12* (2013.01); *B60L 2240/421* (2013.01); *B60L 2240/423* (2013.01); *B60L 2240/429* (2013.01); *B60L 2250/26* (2013.01)

(58) Field of Classification Search
CPC ............. H02P 6/002; H02P 6/08; H02P 6/14; H02P 29/02; H02P 21/0028; H02P 21/0035; H02P 21/14
USPC ............. 318/400.02, 400.07, 400.15, 400.21, 318/609
See application file for complete search history.

(56) References Cited

U.S. PATENT DOCUMENTS 7,893,637 B2 * 2/2011 Suhama .................... B60L 7/16
318/366
8,179,068 B2 * 5/2012 Yuuki .................. H02K 1/2766
318/432

(Continued)

FOREIGN PATENT DOCUMENTS

| JP | 2004-159391 | 6/2004 |
| JP | 2006-44338 | 2/2006 |

(Continued)

OTHER PUBLICATIONS

Office Action (2 pgs.) dated Oct. 1, 2015 issued in corresponding Japanese Application No. 2013-229562 with an at least partial English language translation (3 pgs.).

*Primary Examiner* — Bentsu Ro
(74) *Attorney, Agent, or Firm* — Nixon & Vanderhye PC

(57) ABSTRACT

According to a control apparatus for an AC motor, a switching section selects a two-phase control current value as a current fixing value, when a first current detection value of a first phase of the AC motor and a second current detection value of a second phase of the AC motor are normal. The switching section selects an one-phase control current value, which is calculated based on a normal phase current detection value, which is a value of the normal phase and is one of the first and the second current detection values, as the current fixing value, when it is determined that the current supplied to the AC motor has been stabilized after an abnormality is detected in part of the first and second detection values.

10 Claims, 10 Drawing Sheets

(56) References Cited

U.S. PATENT DOCUMENTS

| | | | |
|---|---|---|---|
| 8,981,688 B2* | 3/2015 | Suzuki | H02P 29/027 318/400.02 |
| 2006/0022626 A1 | 2/2006 | Kobayashi et al. | |
| 2008/0079385 A1 | 4/2008 | Hashimoto et al. | |
| 2015/0123580 A1 | 5/2015 | Omata et al. | |

FOREIGN PATENT DOCUMENTS

| | | |
|---|---|---|
| JP | 2007-185043 | 7/2007 |
| JP | 2008-086139 | 4/2008 |
| JP | 2010-279110 | 12/2010 |
| JP | 2015-91166 | 5/2015 |

* cited by examiner

CONTROL APPARATUS FOR AC MOTOR

CROSS-REFERENCE TO RELATED APPLICATION

This application is based on and claims the benefit of priority from earlier Japanese Patent Application No. 2013-229562 filed Nov. 5, 2013, the description of which is incorporated herein by reference.

BACKGROUND

1. Technical Field

The present invention relates to a control apparatus for an alternating-current (AC) motor.

2. Related Art

From a societal need of low fuel consumption and low exhaust emission, electric cars and hybrid cars mounting an AC motor as a power source of the cars are now gaining attention. For example, in a hybrid car, a direct-current (DC) power source composed such as of a secondary battery is connected to an AC motor via a power converter which is configured such as by an inverter. A DC voltage outputted from the DC power source is converted to an AC voltage by the inverter to thereby drive the AC motor.

Such a hybrid car or an electric car is mounted with a control apparatus used for the AC motor. A patent document JP-A-2007-185043, for example, discloses that, in such a control apparatus, two current sensors are provided per phase and, when the difference between the two current sensor values exceeds a threshold, one of the current sensors is determined to have a fault. Further, in this control apparatus, waveforms of the current sensor values of a different phase with an offset of 120° in phase are generated. The generated waveforms are compared with the current detection values of the phase, in which one of the current sensors has a fault, to specify a normal current sensor value, and the normal current sensor value is used for continuing feedback control.

Another patent document JP-A-2008-086139 discloses that three-phase alternating current commands are obtained by subjecting d- and q-axis current commands and an electrical angle to reverse d-q conversion. In addition to current detection values of one phase as a sensor phase, the three-phase alternating current commands are used as current estimate values for the phases other than the sensor phase.

In JP-A-2007-185043, when one of the current sensors provided in one phase has a fault, the current detection value of the other current sensor that is operating normally is used for the continuation of control. Accordingly, if one of the current sensors has a fault, the current sensor continuously used for control cannot be monitored and thus the monitoring performance is lowered.

In JP-A-2008-086139, control is constantly performed on the basis of the current detection values of one phase. Therefore, for example, in the event that an abnormal current is generated due to a fault or the like of a current sensor, it is difficult to properly capture the state of the fault for the control of the AC motor. Hereinafter, the control using the current detection values of one phase is referred to as one-phase control and the control using current detection values of two phases is referred to as two-phase control.

SUMMARY

An embodiment provides a control apparatus for an AC motor, which enables stable shift to one-phase control when an abnormality occurs in current detection values.

As an aspect of the embodiment, a control apparatus for an AC motor is provided. The control apparatus controls driving of a polyphase AC motor in which applied voltage is controlled by an inverter. The apparatus includes: a first current acquiring section which acquires a first current detection value from a first current sensor provided in a first phase of the AC motor; a second current acquiring section which acquires a second current detection value from a second current sensor provided in a second phase of the AC motor; a rotation angle acquiring section which acquires a rotation angle detection value from a rotation angle sensor, which detects a rotation angle of the AC motor; a two-phase control current value calculating section which calculates a two-phase control current value based on the first current detection value, the second current detection value, and the rotation angle detection value; an one-phase control current value calculating section which calculates an one-phase control current value based on either of the first current detection value and the second current detection value, and the rotation angle detection value; an abnormality monitoring section which monitors occurrence of an abnormality in the first current detection value and the second current detection value to specify an abnormal phase, in which the abnormality has occurred, and a normal phase, in which no abnormality has occurred; a switching section which selects the two-phase control current value or the one-phase control current value as a current fixing value depending on whether the first current detection value and the second current detection value are normal or not; a voltage command value calculating section which calculates a voltage command value associated with voltage to be applied to the AC motor based on the current fixing value and a command value associated with driving of the AC motor; a drive control section which generates a drive signal associated with drive control of the inverter based on the voltage command value, and outputs the drive signal to the inverter; a stabilization control section which stabilizes current supplied to the AC motor, when an abnormality is detected in part of the first current detection value and the second current detection value; and a stabilization determination section which determines whether or not the current supplied to the AC motor has been stabilized, after the abnormality is detected in part of the first current detection value and the second current detection value. The switching section selects the two-phase control current value as the current fixing value when the first current detection value and the second current detection value are normal. The switching section selects the one-phase control current value, which is calculated based on a normal phase current detection value, which is a value of the normal phase and is one of the first current detection value and the second current detection value, as the current fixing value, when the stabilization determination section determines that the current supplied to the AC motor has been stabilized after an abnormality is detected in part of the first current detection value and the second current detection value.

DETAILED DESCRIPTION OF THE PREFERRED EMBODIMENTS

Figure 1:
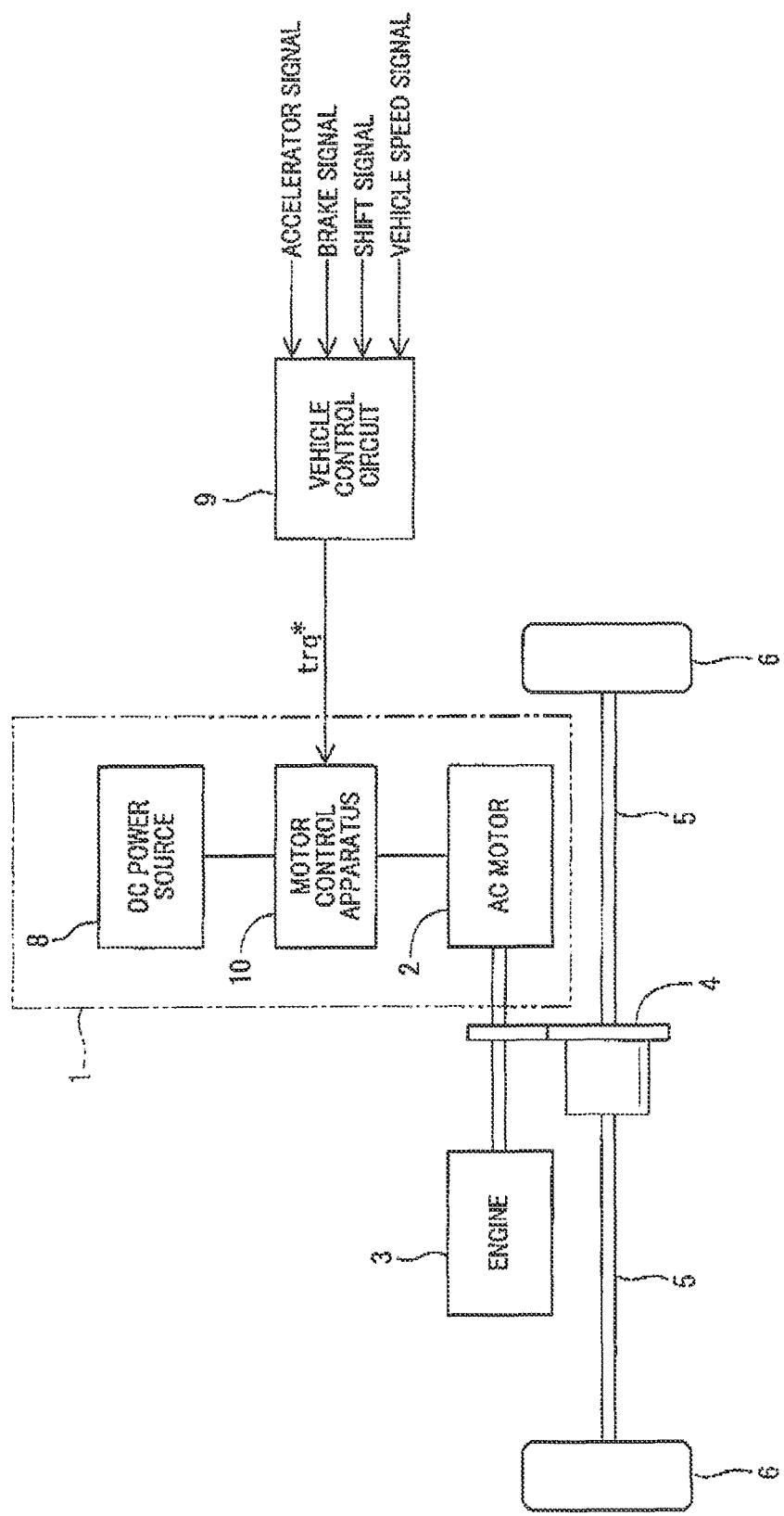
FIG. 1 is a schematic diagram illustrating a configuration of an AC motor drive system, according to a first embodiment.

With reference to the accompanying drawings, hereinafter are described several embodiments of a control apparatus for an alternating-current (AC) motor. Throughout the following embodiments, substantially identical or similar components are given the same reference numerals for the sake of omitting unnecessary explanation.

First Embodiment

Referring to FIGS. 1 to 7, a control apparatus for an AC motor according to a first embodiment is described.

FIG. 1 is a schematic diagram illustrating a configuration of a motor drive system 1 used for driving an electric vehicle, according to the first embodiment. As shown in FIG. 1, a motor control apparatus 10 that serves as a control apparatus for an AC motor 2 is applied to the motor drive system 1 which drives an electric vehicle.

The motor drive system 1 includes an AC motor 2, a direct-current (DC) power source 8 and the motor control apparatus 10 serving as the control apparatus for an AC motor.

The AC motor 2 generates torque for driving drive wheels 6 such as of an electric vehicle. The AC motor 2 of the present embodiment is a permanent magnet synchronous three-phase (polyphase, multiphase) AC motor.

It should be noted that electric vehicles include, for example, hybrid cars, electric cars and fuel-cell cars, in which the drive wheels 6 are driven by electric energy. The electric vehicle of the present embodiment is a hybrid vehicle provided with an engine 3. Thus, the AC motor 2 is a so-called motor-generator (marked as "MG" in the drawings) having a function of a motor that generates torque for driving the drive wheels 6, and a function of a generator that is driven by the vehicle's kinetic energy transmitted from the engine 3 and the drive wheels 6 to enable electric power generation.

The AC motor 2 is connected to an axle shaft 5 via, for example, a gear 4, such as a speed-change gear. Thus, the torque generated by driving the AC motor 2 rotates the axle shaft 5 via the gear 4 to thereby drive the drive wheels 6.

The DC power source 8 is an electric storage device including, for example, a secondary battery such as of nickel hydride or lithium ion, or an electric double layer capacitor, which is capable of charge and discharge. The DC power source 8 is connected to an inverter 11 (see FIG. 2) of the motor control apparatus 10, and is configured to enable transmission/reception of electric power to/from the AC motor 2 via the inverter 11.

The motor control apparatus 10 is connected to a vehicle control circuit 9. The vehicle control circuit 9 is configured such as by a microcomputer which is provided therein with a CPU, a ROM, an I/O unit, not shown, and a bus line, not shown, that connect these components, and the like. The CPU of the vehicle control circuit 9 executes programs stored in advance to perform software processing and also to perform hardware processing using a dedicated electronic circuit, thereby controlling the entire electric vehicle.

The vehicle control circuit 9 is configured to acquire an accelerator signal from an accelerator sensor, a brake signal from a brake switch and a shift signal from a shift switch, as well as signals, such as a vehicle speed signal, from various sensors, switches and the like. These components are not shown in the drawings.

The vehicle control circuit 9 detects the operating condition of the vehicle on the basis of these acquired signals and the like and outputs a torque command value trq* to the motor control apparatus 10 in accordance with the operating condition.

Further, the vehicle control circuit 9 outputs a command signal to an engine control circuit, not shown, to control the operation of the engine 3.

Figure 2:
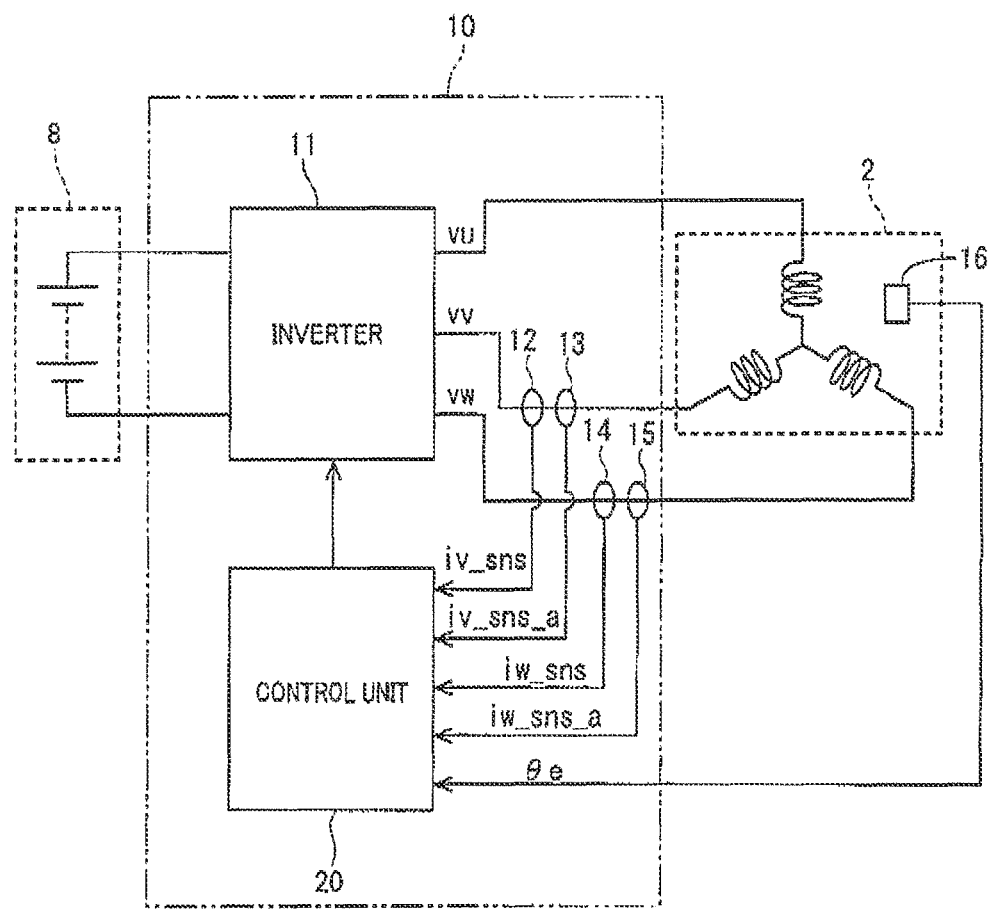
FIG. 2 is a block diagram illustrating a configuration of a motor control apparatus, according to the first embodiment.

FIG. 2 is a block diagram illustrating a configuration of the motor control apparatus 10. As shown in FIG. 2, the motor control apparatus 10 includes the inverter 11 and a control unit 20.

The inverter 11 is applied with an inverter input voltage VH in accordance with a state of driving of the AC motor 2 and vehicle requests, for example. The inverter input voltage VH is obtained by boosting a DC voltage of the DC power source 8 using a boost converter, not shown. The inverter 11 includes six switching elements, not shown, which are in a bridge connection. For example, the switching elements may include IGBTs (insulated gate bipolar transistors), MOSs (metal oxide semiconductors) transistors, bipolar transistors, and the like. The on/off of the switching elements is controlled on the basis of drive signals UU, UL, VU, VL, WU and WL outputted from a PWM (pulse width modulation) signal generation section 25 (see FIG. 3) of the control unit 20.

The inverter 11 thus controls three-phase AC voltages vu vv and vw to be applied to the AC motor 2. The driving of the AC motor 2 is controlled with the application of the three-phase AC voltages vu vv and vw generated by the inverter 11. In the present embodiment, the AC motor 2 is under sinusoidal PWM control or overmodulation PWM control. With the application of the three-phase AC voltages vu, vv and vw to U, V and W phases, currents iu, iv and iw, respectively, are passed therethrough. In a sinusoidal PWM control mode, fundamental wave components in a fixed period (e.g., one PWM cycle) are controlled to be sinusoidal waves. In an overmodulation PWM control mode, an original sinusoidal waveform of a voltage command is distorted to enhance voltage utilization ratio.

The motor control apparatus 10 includes a control V-phase current sensor 12, a monitoring V-phase current sensor 13, a control W-phase current sensor 14 and a monitoring W-phase current sensor 15.

The control V-phase current sensor 12 detects a current passing through the V phase and outputs a control V-phase current detection value iv_sns to the control unit 20. The control V-phase current detection value iv_sns is used for the calculations performed in a current detection section 30 and a current estimation section 40, which are discussed later.

The monitoring V-phase current sensor 13 detects a current supplied to the V phase and outputs a monitoring V-phase current detection value iv_sns_a to the control unit 20. The monitoring V-phase current detection value iv_sns_a is used for abnormality monitoring of the control V-phase current detection value iv_sns.

The control W-phase current sensor 14 detects a current supplied to the W phase and outputs a control W-phase current detection value iw_sns to the control unit 20. The control W-phase current detection value iw_sns is used for the calculations performed in the current detection section 30 and the current estimation section 40.

The monitoring W-phase current sensor 15 detects a current supplied to the W phase and outputs a monitoring W-phase current detection value iw_sns_a to the control unit 20. The monitoring W-phase current detection value iw_sns_a is used for abnormality monitoring of the control W-phase current detection value iw_sns.

Hereinafter, the control V-phase current detection value iv_sns, the monitoring V-phase current detection value iv_sns_a, the control W-phase current detection value iw_sns and the monitoring W-phase current detection value iw_sns_a are simply referred to as current detection values, as appropriate.

A rotation angle sensor 16 is provided near a rotor, not shown, of the AC motor 2 to detect an electrical angle θe and outputs the detected electrical angle θe to the control unit 20. The rotation angle sensor 16 of the present embodiment is a resolver. Besides, the rotation angle sensor 16 may be a different type sensor, such as a rotary encoder.

The control unit 20 is configured such as by a microcomputer which is provided therein with a CPU ROM, RAM and I/O unit, not shown, and a bus line or the like, not shown, connecting these components. The control unit 20 acquires various detection values, such as the control V-phase current detection value iv_sns, the monitoring V-phase current detection value iv_sns_a, the control W-phase current detection value iw_sns, the monitoring W-phase current detection value iw_sns_a and the electrical angle θe. Based on these detection values, the control unit 20 allows the CPU to execute programs stored in advance to perform software processing and also to perform hardware processing through a dedicated electronic circuit, thereby controlling the operation of the AC motor 2. The same applies to a control unit 80 in another embodiment discussed later.

Drive control of the AC motor 2 is described below. The motor control apparatus 10 permits the AC motor 2 to perform a powering operation as a motor to consume electric power, and a regenerative operation as a generator to generate electric power. These operations are performed according to the number of rotations per unit time N (hereinafter just referred to as rotation number N) of the AC motor 2, which is based on the electrical angle θe detected by the rotation angle sensor 16, and the torque command value trq* derived from the vehicle control circuit 9. Specifically, depending on the rotation number N and whether the torque command value trq* is negative or positive, the operations are switched in the following four patterns.

<1. Forward Rotation Powering Operation>
Electric power is consumed when the rotation number N is positive and the torque command value trq* is positive.

<2. Forward Rotation Regenerative Operation>
Electric power is generated when the rotation number N is positive and the torque command value trq* is negative.

<3. Reverse Rotation Powering Operation>
Electric power is consumed when the rotation number N is negative and the torque command value trq* is negative.

<4. Reverse Rotation Regenerative Operation>
Electric power is generated when the rotation number N is negative and the torque command value trq* is positive.

When the rotation number N>0 (forward rotation) and the torque command value trq*>0 are satisfied (<1> above), or when the rotation number N<0 (reverse rotation) and the torque command value trq*<0 are satisfied (<3> above), the inverter 11 operates as follows. Specifically, with the switching operation of the switching elements, the inverter 11 converts the DC power supplied from the DC power source 8 to AC power so that the AC motor 2 is driven for the output of torque (performs powering operation).

On the other hand, when the rotation number N>0 (forward rotation) and the torque command value trq*<0 are satisfied (<2> above) or when the rotation number N<0 (reverse rotation) and the torque command value trq*>0 are satisfied (<4> above), the inverter 11 operates as follows. Specifically, with the switching operation of the switching elements, the inverter 11 converts the AC power generated by the AC motor 2 to DC power for the supply of the DC power to the DC power source 8 to thereby perform regenerative operation.

Figure 3:
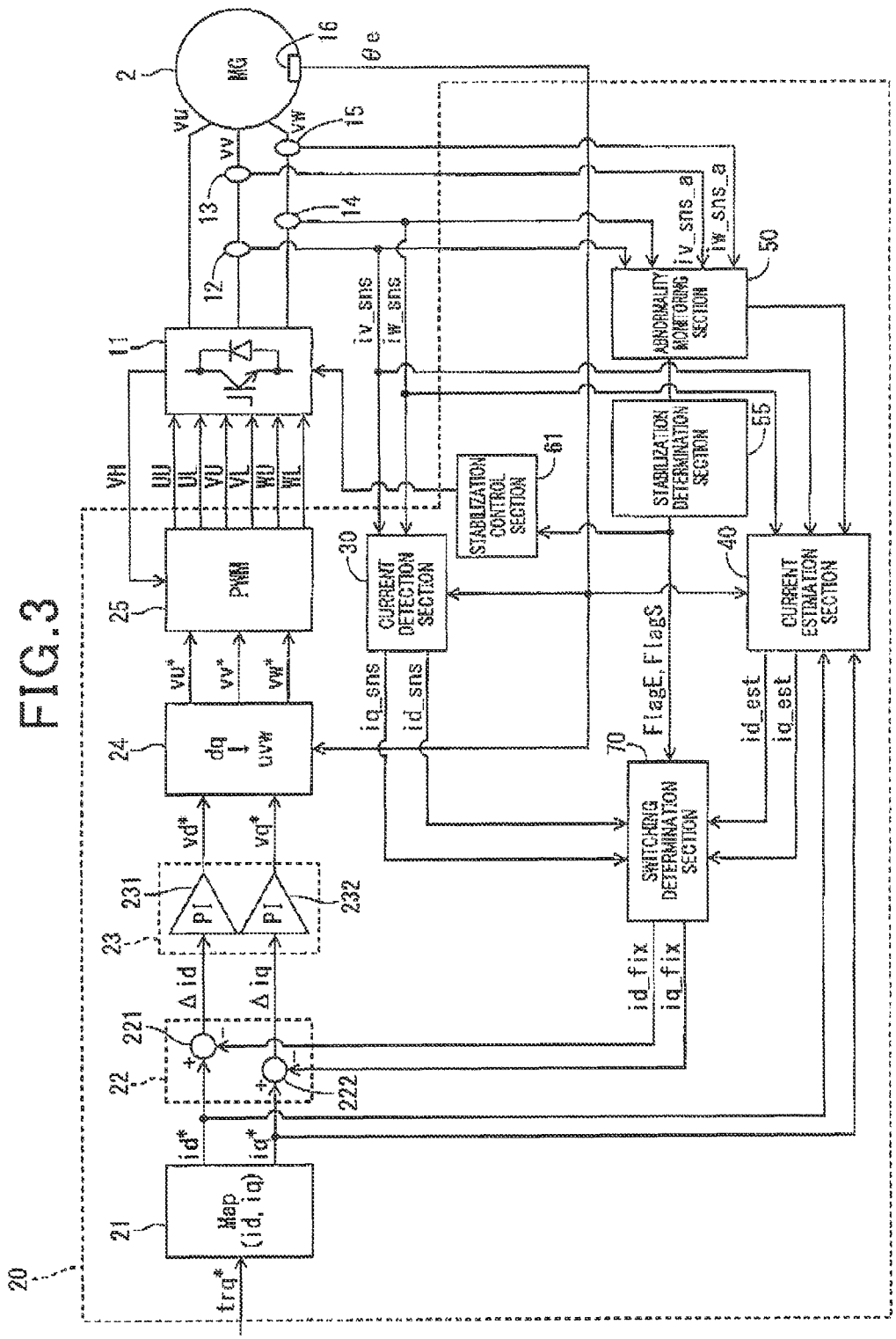
FIG. 3 is a block diagram illustrating a configuration of a control unit, according to the first embodiment.

Referring to FIG. 3, the details of the control unit 20 are described. FIG. 3 is a block diagram illustrating a configuration of the control unit 20. As shown in FIG. 3, the control unit 20 includes, for example, a current command value calculation section 21, a subtractor (subtraction section) 22, a PI (proportional plus integral) calculation section 23, a three-phase voltage command value calculation section 24, a PWM signal generation section 25, a current detection section 30, a current estimation section 40, an abnormality monitoring section 50, a stabilization determination section 55, a stabilization control section 61 and a switching determination section 70.

The current command value calculation section 21 uses, as a basis, the torque command value trq* acquired from the vehicle control circuit 9 and calculates a d-axis current command id* and a q-axis current command value iq* in a rotating coordinate system (d-q coordinate system) which is set as a rotating coordinate for the AC motor 2. In the present embodiment, the d- and q-axis current command values id* and iq* are calculated with reference to a map stored in advance. However, these command value may be ensured to be calculated from a formula or the like.

The subtractor 22 includes a d-axis current subtractor 221 and a q-axis current subtractor 222. The d-axis current subtractor 221 calculates a d-axis current deviation Δid that is the difference between a d-axis current fixing value id_fix fed back from the switching determination section 70 and the d-axis current command id*. The q-axis current subtractor 222 calculates a q-axis current deviation Δiq that is the difference between a q-axis current fixing value iq_fix fed back from the switching determination section 70 and the q-axis current command value iq*.

The PI calculation section 23 includes a d-axis PI calculator 231 and a q-axis PI calculator 232. The d-axis PI calculator 231 calculates a d-axis voltage command value vd* through PI calculation so that the d-axis current fixing value id_fix should follow the d-axis current command value id*. Thus, in the calculation, the d-axis current deviation Δid is ensured to converge on 0 ampere [A]. The q-axis PI calculator 232 calculates a q-axis voltage command value vq* through PI calculation so that the q-axis current fixing value iq_fix should follow the q-axis current command value iq*. Thus, in the calculation, the q-axis current deviation Δiq is ensured to converge on 0 ampere [A].

The three-phase voltage command value calculation section 24 converts the d- and q-axis voltage commands vd* and vq* to a U-phase voltage command value vu*, a V-phase voltage command value vv* and a W-phase voltage command value vw* by reverse d-q conversion on the basis of the electrical angle θe acquired from the rotation angle sensor 16.

The PWM signal generation section 25 calculates drive signals UU, UL, VU, VL, WU and WL which are associated with the switching of the on/off-state of the switching elements of the inverter 11, on the basis of the three-phase AC voltage command values vu*, vv* and vw*, and the inverter input voltage VH applied to the inverter 11.

Then, based on the drive signals UU, UL, VU, VL, WU and WL, the on/off-state of the switching elements of the inverter 11 is controlled to thereby generate three-phase AC voltages vu, vv and vw. The three-phase AC voltages vu, vv and vw are then applied to the AC motor 2 to control the driving thereof. As a result, torque equivalent to the torque command value trq* is outputted. It should be noted that the three-phase AC voltages vu, vv and vw correspond to the "applied voltage".

The current detection section 30 performs d-q conversion and calculates a d-axis current detection value id_sns and a q-axis current detection value iq_sns as two-phase control current values. The calculation is based on the control V- and W-phase current detection values iv_sns and iw_sns, and the electrical angle θe.

Formula (1), as a general formula, used for the d-q conversion is indicated below.

$$\begin{bmatrix} id\_sns \\ iq\_sns \end{bmatrix} = \sqrt{\frac{2}{3}} \begin{bmatrix} \cos(\theta e) & \cos(\theta e - 120°) & \cos(\theta e + 120°) \\ -\sin(\theta e) & -\sin(\theta e - 120°) & -\sin(\theta e + 120°) \end{bmatrix} \begin{bmatrix} iu \\ iv \\ iw \end{bmatrix} \quad (1)$$

From Kirchhoff's law (see Formula (2)), Formula (3) is obtained. Substituting the control V-phase current detection value iv_sns for the V-phase current iv and substituting the control W-phase current detection value iw_sns for the W-phase current iw in Formula (1), the following Formula (4) is obtained.

$$iu + iv + iw = 0 \quad (2)$$

$$iu = -iv - iw \quad (3)$$

$$\begin{bmatrix} id\_sns \\ iq\_sns \end{bmatrix} = \sqrt{\frac{2}{3}} \begin{bmatrix} \cos(\theta e - 120°) - & \cos(\theta e + 120°) - \\ \cos(\theta e) & \cos(\theta e) \\ -\sin(\theta e - 120°) - & -\sin(\theta e + 120°) + \\ \sin(\theta e) & \sin(\theta e) \end{bmatrix} \begin{bmatrix} iv\_sns \\ iw\_sns \end{bmatrix} \quad (4)$$

$$= \sqrt{\frac{2}{3}} \times \sqrt{3} \begin{bmatrix} -\cos(\theta e + 30°) & \cos(\theta e + 150°) \\ \sin(\theta e + 30°) & -\sin(\theta e + 150°) \end{bmatrix} \begin{bmatrix} iv\_sns \\ iw\_sns \end{bmatrix}$$

$$= \sqrt{2} \begin{bmatrix} -\sin(\theta e + 120°) & \sin(\theta e + 120°) \\ -\cos(\theta e + 120°) & \cos(\theta e + 120°) \end{bmatrix} \begin{bmatrix} iv\_sns \\ iw\_sns \end{bmatrix}$$

As indicated in Formula (4), when current values of two phases among three phases are available, the d- and q-axis current detection values id_sns and iq_sns can be calculated. Accordingly, the current value of another phase (U phase in the present embodiment) is not required to be calculated.

The d- and q-axis current detection values id_sns and iq_sns calculated by the current detection section 30 are outputted to the switching determination section 70.

The current estimation section 40 calculates a d-axis current estimate value id_est and a q-axis current estimate value iq_est as one-phase control current values. The calculation is based on the control V- or W-phase current detection value iv_sns or iw_sns, and the electrical angle θe. In the present embodiment, the d- and q-axis current estimate values id_est and iq_est are calculated on the basis of not only the control V- or W-phase current detection value iv_sns or iw_sns, and the electrical angle θe, but also the d- and q-axis current commands id* and iq*.

In order to enable one-phase control based on whichever of the current estimate values calculated from the control V- and W-phase current detection values iv_sns and iw_sns, the current estimation section 40 may parallelly calculate in advance both of these current estimate values so that whichever of them is available for one-phase control.

The description here is provided by way of an example in which the control W-phase current detection value iw_sns is used for the calculation of the d- and q-axis current estimate values id_est and iq_est. Hereinafter, the phase of the current detection value that is used for the calculation of the d- and q-axis current estimate values id_est and iq_est is referred to as sensor phase, as appropriate.

Figure 4:
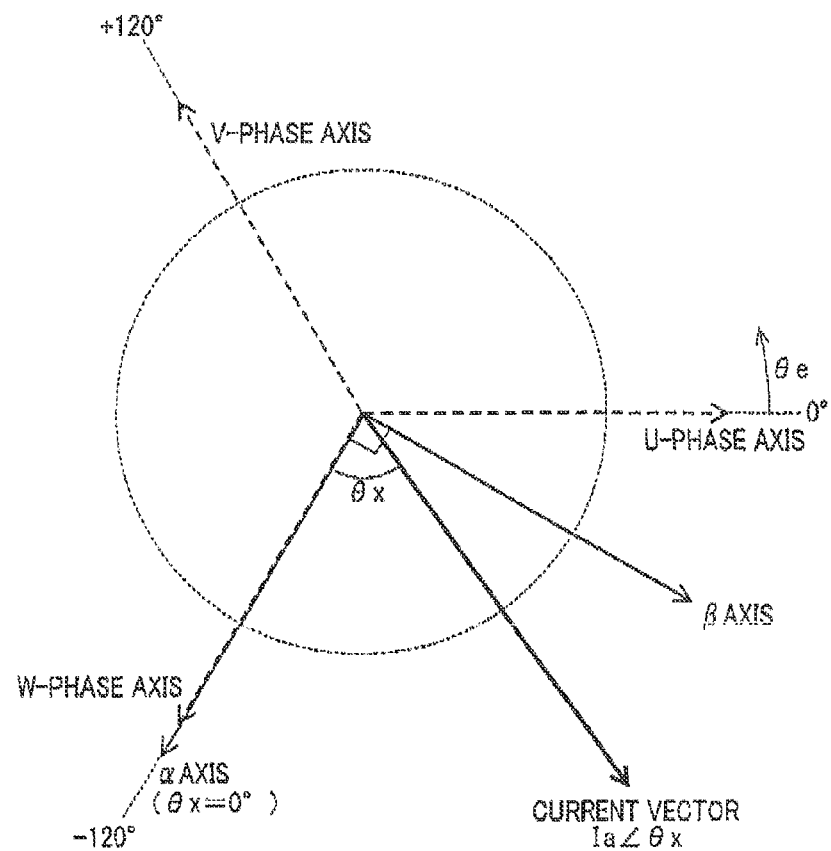
FIG. 4 is a diagram illustrating an α axis and a β axis, according to the first embodiment.

FIG. 4 is a diagram illustrating an α axis and a β axis. As shown in FIG. 4, in the present embodiment, an axis that coincides with the W phase as a sensor phase is defined to be an α axis, while an axis perpendicular to the α axis is defined to be a β axis. Use of the α and β axes enhances the accuracy of estimating the d- and q-axis current estimate values id_est and iq_est. It should be noted that, if the control V-phase current detection value iv_sns is used for the calculation of the d- and q-axis current estimate values id_est and iq_est, the axis coinciding with the V-phase is defined to be the α axis.

In the present embodiment, an α-axis current iα in the α-axis direction and a β-axis current iβ in the β-axis direction are calculated using at least either one of the U- and V-phase current command values iu* and iv*, the control W-phase current detection value iw_sns and the electrical angle θe. The U-phase current command iu* and a V-phase current command iv* are calculated through reverse d-q conversion on the basis of the d- and q-axis current command values id* and iq*.

For example, the α-axis current iα and the β-axis current iβ are expressed by the following Formulas (5) and (6). In these formulas, Kt represents a conversion factor.

$$i\alpha = Kt \times \frac{3}{2} \times iw\_sns \quad (5)$$

$$i\beta = Kt \times \left( \frac{\sqrt{3}}{2} \times iu^* - \frac{\sqrt{3}}{2} iv^* \right) \quad (6)$$

In order to reflect an actual current with high accuracy in the β-axis current iβ, the control W-phase current detection value iw_sns may be included in Formula (6). For the inclusion, Formula (6) may be transformed into Formula (7) on the basis of Kirchhoff's law (Formula (2)).

$$i\beta = Kt \times \left( -\sqrt{3} \times iv^* - \frac{\sqrt{3}}{2} iw\_sns \right) \quad (7)$$

Further, a sensor-phase reference current phase θx is calculated from arctangent functions (arctan) of the α-axis current iα and the β-axis current iβ. The sensor-phase reference current phase θx is an angle made between the α-axis and a current vector Ia∠θx in the α-β coordinate system.

An arithmetic expression of the sensor-phase reference current phase θx is shown in Formula (8).

$$\theta x = \tan^{-1}(i\beta/i\alpha) \quad (8)$$

Further, a U-phase current estimate value iu_est or a V-phase current estimate value iv_est is calculated on the basis of the sensor-phase reference current phase θx and the control W-phase current detection value iw_sns. The description here is provided by way of an example of calculating the V-phase current estimate value iv_est.

Taking account of the phase difference of 120° between phases, the control W-phase current detection value iw_sns and the V-phase current estimate value iv_est are expressed by Formulas (9) and (10), respectively, using the sensor-phase reference current phase θx. In Formulas (9) and (10), Ia represents a current amplitude.

$$iw\_sns = Ia \times \sin(\theta x) \quad (9)$$

$$iv\_est = Ia \times \sin(\theta x + 120°) \quad (10)$$

When Formula (10) is deformed using an addition theorem, the V-phase current estimate value iv_est is expressed by Formula (11) on the basis of the sensor-phase reference current phase θx and the control W-phase current detection value iw_sns.

$$\begin{aligned} iv\_est &= Ia \times \sin(\theta x + 120°) \\ &= -\frac{1}{2} \times Ia \times \sin(\theta x) + \frac{\sqrt{3}}{2} \times Ia \times \cos(\theta x) \\ &= -\frac{1}{2} \times iw\_sns + \frac{\sqrt{3}}{2} \times \frac{Ia \times \sin(\theta x)}{\tan(\theta x)} \\ &= \left\{ -\frac{1}{2} + \frac{\sqrt{3}}{2} \times \frac{1}{\tan(\theta x)} \right\} \times iw\_sns \end{aligned} \quad (11)$$

When an estimated coefficient iv_kp as expressed by Formula (12) is applied, the V-phase current estimate value iv_est can also be expressed as Formula (13).

$$iv\_kp = -\frac{1}{2} + \frac{\sqrt{3}}{2} \times \frac{1}{\tan(\theta x)} \quad (12)$$

$$iv\_est = iv\_kp \times iw\_sns \quad (13)$$

The estimated coefficient iv_kp may be calculated using Formula (12), or may be calculated by referring to a map that has been prepared in advance by partially or entirely mapping Formula (12) on the basis of the sensor-phase reference current phase θx.

The U-phase current estimate value iu_est can be similarly calculated.

Then, d-q conversion is carried out on the basis of the calculated V- or U-phase current estimate value iv_est or iu_est, the control W-phase current detection value iw_sns and the electrical angle θe. As a result, the d- and q-axis current estimate values id_est and iq_est are calculated.

It should be noted that, in calculating the V- and V-phase current estimate values iu_est and iv_est, a correction may appropriately be conducted to avoid zero division (i.e. a division by zero) or zero multiplication (i.e. multiplication by zero).

In the present embodiment, the α and β axes are defined and, on the basis of the α-axis current iα and the β-axis current iβ, the sensor-phase reference current phase θx is calculated, which is an actual current phase based on the sensor phase. Based on the sensor-phase reference current phase θx and the control W-phase current detection value iw_sns, the U- or V-phase current estimate value iu_est or iv_est that is a current estimate value of another phase is calculated. Accordingly, taking account of the harmonic components of the actual sensor-phase reference current phase θx or the influence of variation that could routinely occur, the U- or V-phase current estimate value iu_st or iv_est can be calculated with good accuracy.

The current vector Ia∠θx of the AC motor 2 follows a command current vector that is in conformity with the d- and q-axis current command values id* and iq*, while being influenced such as by a control error or feedback control. Accordingly, there is a deviation between an actual current phase and a command current phase. Considering this, in the present embodiment, the actual sensor-phase reference current phase θx is used in addition to the d- and q-axis current command values id* and iq*. Accordingly, for example, comparing with the case where a reverse d-q conversion value of the d- and q-axis current command values id* and iq* is used as a current estimate value of another phase, the current estimate value of another phase can be more accurately calculated. In particular, calculation of the sensor-phase reference current phase θx using Formula (7) that includes a current detection value in calculating the β-axis current iβ, leads to the expansion of a range in which the influence of the current detection value is larger but the calculation error of the sensor-phase reference current phase θx is smaller in the α-β coordinate system. The expansion of this range further leads to the enhancement of the calculation accuracy of the current estimate value of another phase, or, in other words, leads to the enhancement of convergence for a true value.

As shown in FIG. 3, the abnormality monitoring section 50 monitors the occurrence of abnormality in the current sensors 12 to 15. Specifically, the abnormality monitoring section 50 monitors the occurrence of an abnormality in the control V-phase current detection value iv_sns detected by the control V-phase current sensor 12, the monitoring V-phase current detection value iv_sns_a detected by the monitoring V-phase current sensor 13, the control W-phase current detection value iw_sns detected by the control W-phase current sensor 14, and the monitoring W-phase current detection value iw_sns_a detected by the monitoring W-phase current sensor 15.

More specifically, the abnormality monitoring section 50 compares the control V-phase current detection value iv_sns with the monitoring V-phase current detection value iv_sns_a to monitor deviation abnormality. Further, the abnormality monitoring section 50 compares the control W-phase current detection value iw_sns with the monitoring W-phase current detection value iw_sns_a to monitor deviation abnormality. In addition, the abnormality monitoring section 50 also monitors, for example, a fixed upper limit abnormality in which a predetermined upper limit is continued to be outputted, a fixed lower limit abnormality in which a predetermined lower limit is continued to be outputted, and an offset abnormality in which a zero point is offset.

When an abnormality, such as a deviation abnormality, a fixed upper or lower limit abnormality, or an offset abnormality, is detected, the abnormality monitoring section 50 specifies a phase that includes the current detection value in which the abnormality has occurred (hereinafter referred to as abnormal phase), and a phase where no abnormality has occurred in the current detection value (hereinafter referred to as normal phase). In the present embodiment, it is not necessary to specify whether the current detection value that is abnormal is used for control or for monitoring.

The abnormality monitoring section 50 outputs an abnormality flag FlgE to the stabilization control section 61 and the switching determination section 70. The abnormality flag FlgE indicates information on the occurrence of an abnormality in a current detection value. If a current detection value is abnormal, the abnormality flag is FlgE=1, and if the current detection value is not abnormal, the abnormality flag is FlgE=0.

Further, the abnormality monitoring section 50 outputs the information on the specified abnormal phase to the current estimation section 40. When the information on an abnormal phase is outputted from the abnormality monitoring section 50, the current estimation section 40 avoids using the current detection value of the abnormal phase, but instead uses, as a basis, the control current detection value of the normal phase for the calculation of the d- and q-axis current estimate value id_est and iq_est. Specifically, if the abnormal phase is the V phase, the current estimation section 40 calculates the d- and q-axis current estimate values id_est and iq_est using the control W-phase current detection value iw_sns. If the abnormal phase is the W phase, the current estimation section 40 calculates the d- and q-axis current estimate values id_est and iq_est using the control V-phase current detection value iv_sns.

Hereinafter, an example is mainly described in which an abnormality occurs in the control V-phase current sensor 12.

When an abnormality has been detected in the current detection value by the abnormality monitoring section 50, that is, the abnormality flag is FlgE=1, the stabilization determination section 55 determines whether or not the current supplied to the AC motor 2 is stable. In the embodiment, if it is determined that the current supplied to the AC motor 2 is not stable, a stabilization flag is FlgS=1. If it is determined that the current supplied to the AC motor 2 is stable, the stabilization flag is FlgS=0. Note that when an abnormality has not been detected in the current detection value by the abnormality monitoring section 50, that is, if the abnormality flag is FlgE=0, the stabilization determination section 55 does not perform stabilization determination and the stabilization flag FlgS=0 is maintained.

Figure 5:
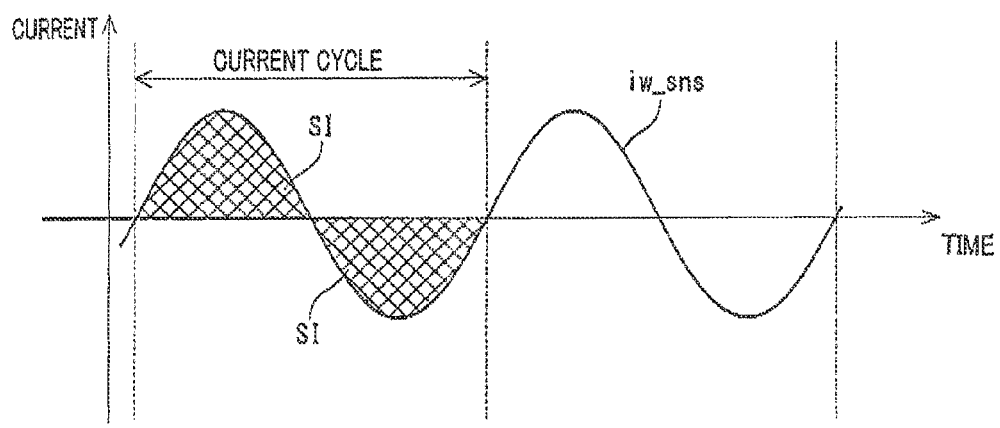
FIG. 5 is an explanatory diagram illustrating stabilization determination, according to the first embodiment.

Referring now to FIG. 5, a stabilization determination process of the present embodiment is described. As shown in FIG. 5, if an integrated value SI over one cycle of current of the control W-phase current detection value iw_sns is within a determination threshold including zero, the stabilization determination section 55 determines that the current supplied to the AC motor 2 is stable. A first determination threshold X1 is set to a value comparatively approximate to zero, taking account of a sensor error or the like. For example, if R1(−)≤SI≤R1(+), where a positive-side determination threshold is R1(+), and a negative-side determination threshold is R1(−), the stabilization determination section 55 determines that the current supplied to the AC motor 2 is stable. Note that absolute values of R1(+) and R1(−) may be equal to or different from each other. In addition, the integrated value SI of the control W-phase current detection value iw_sns used for the determination may be an integrated value over plural cycles.

The stabilization control section 61 performs stabilization control for stabilizing the current supplied to the individual phases of the AC motor 2, on condition that an abnormality is detected in a current detection value by the abnormality monitoring section 50 and it is determined by the stabilization determination section 55 that the current supplied to the AC motor 2 is not stable, i.e. on condition that the abnormality flag is FlgE=1 and the stabilization flag is FlgS=1.

In the stabilization control of the present embodiment, the inverter 11 is shut down. Specifically, the stabilization control section 61 outputs to the inverter 11 a full turn-off signal to turn off all the switching elements configuring the inverter 11. Then, all of the switching elements configuring the inverter 11 are turned off.

Instead of the full turn-off signal, the stabilization control section 61 may generate drive signals UU, UL, VU, VL, WU and WL for turning off all the switching elements and output the generated signals to the inverter 11.

Thus, the current supplied to the AC motor 2 is stabilized without passing an overcurrent therethrough and thus the control W-phase current detection value iw_sns is converged. It should be noted that, depending on an armature interlinkage flux ψ or an electrical angular velocity ω of the permanent magnets of the AC motor 2, and the inverter input voltage VH, the current supplied to the AC motor 2 becomes zero and thus the control W-phase current detection value iw_sns converges on zero.

The switching determination section 70 switches the d- and q-axis current detection values id_sns and iq_sns, to the d- and q-axis current estimate values id_est and iq_est, or vice versa, which are used for calculating the d- and q-axis voltage command values vd* and vq*, depending on whether the control V- and W-phase current detection values iv_sns and iw_sns and the monitoring V- and W-phase current detection values iv_sns_a and iw_sns_a are normal or not. In the present embodiment, the switching determination section 70 performs switching for the currents (selects currents) that are fed back to the subtractor 22.

When no abnormality has been detected in the current detection values, i.e. when the abnormality flag is FlgE=0, the switching determination section 70 selects the d- and q-axis current detection values id_sns and iq_sns calculated by the current detection section 30 as the d- and q-axis current fixing values id_fix and iq_fix, and feeds back the d- and q-axis current detection values id_sns and iq_sns to the subtractor 22. In other words, when no abnormality has been detected in the current detection values, two-phase control is performed on the basis of the control V- and W-phase current detection values iv_sns and iw_sns.

When it is determined that the current supplied to the AC motor 2 is stabilized after detection of an abnormality in a current detection value, i.e. when the abnormality flag is FlgE=1 and the stabilization flag is FlgS=0, the switching determination section 70 selects, as the d- and q-axis current fixing values id_fix and iq_fix, the d- and q-axis current estimate values id_est and iq_est calculated on the basis of the control W-phase current detection value iw_sns, which is the current detection value of a normal phase, by the current estimation section 40. Then the switching determination section 70 feeds back the d- and q-axis current estimate values id_est and iq_est to the subtractor 22. In other words, when the current is stabilized after the detection of an abnormality in a current detection value, one-phase control is performed on the basis of the current detection value of the normal phase.

In the present embodiment, two-phase control may be interpreted to be a normal mode and one-phase control may be interpreted to be a failsafe mode.

Figure 6:
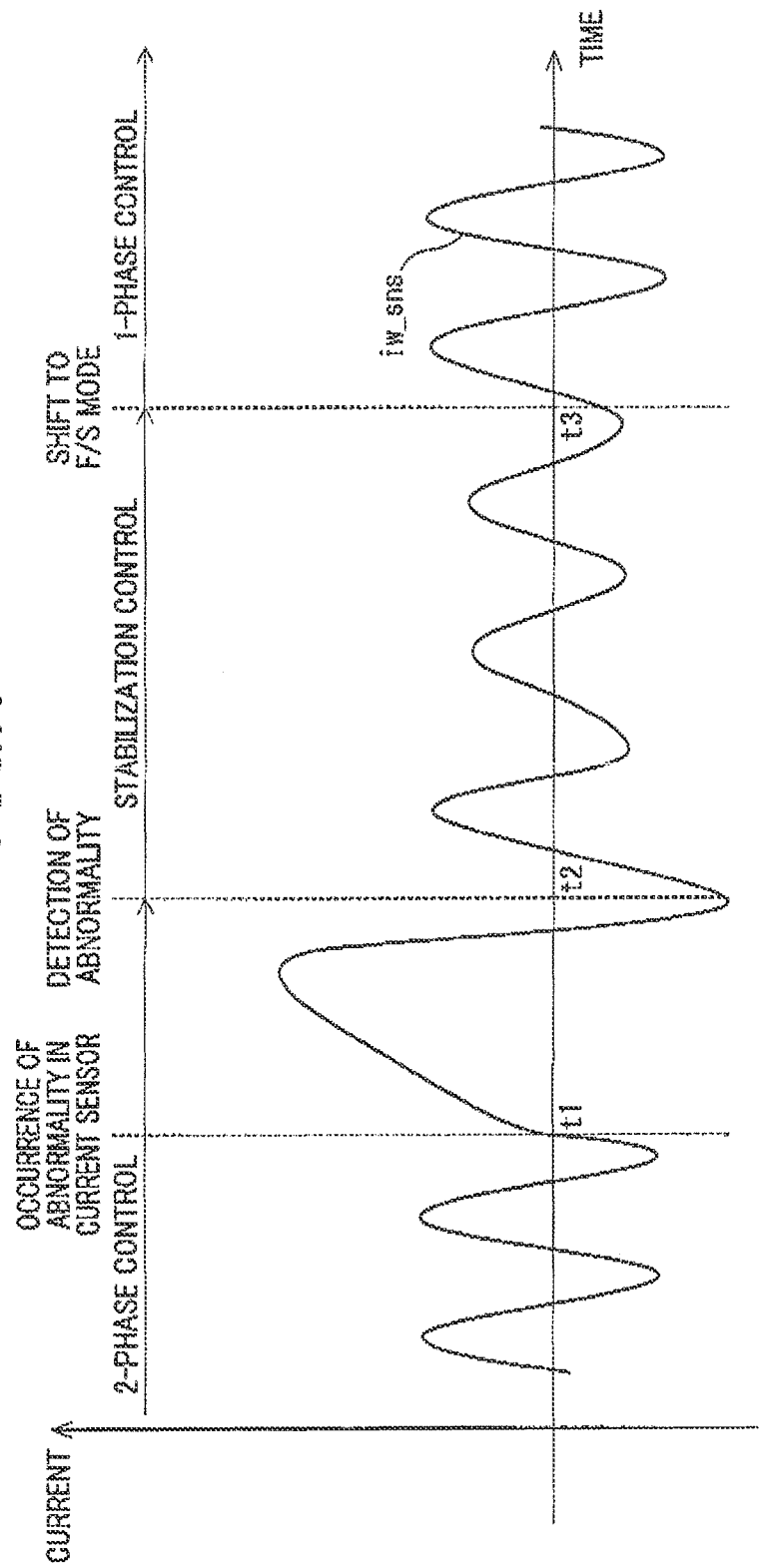
FIG. 6 is an explanatory diagram illustrating a behavior of a control W-phase current detection value, according to the first embodiment.

FIG. 6 shows the control W-phase current detection value iw_sns in the case where an abnormality has occurred in the control V-phase current sensor 12.

As shown in FIG. 6, when an abnormality occurs in the control V-phase current sensor 12 at time t1, feedback control is performed using the abnormal control V-phase current detection value iv_sns during a period from time t1 to time t2 at which the abnormality monitoring section 50 detects the abnormality in the control V-phase current detection value iv_sns. Therefore, there is a concern that the control becomes temporarily unstable. In this case, even if the function of the control W-phase current sensor 14 is normal, the supplied current becomes unstable. Accordingly, there is a concern that the control W-phase current detection value iw_sns becomes unstable.

At time t2 at which the abnormality monitoring section 50 detects the abnormality in the control V-phase current detection value iv_sns, control is switched to one-phase control which is based on the control W-phase current detection value iw_sns. After switching the control, control is then performed on the basis of the unstable control W-phase current detection value iw_sns. In this way, since stabilization is not achieved in the control, there is a probability that stable shift to one-phase control is not ensured.

In the present embodiment, the stabilization control is performed after an abnormality in the control V-phase current detection value iv_sns is detected and until the current supplied to the AC motor 2 becomes stable, without shifting to one-phase control, to stabilize the current supplied to the AC motor 2. The stabilization control refers to a control for creating a stable flow of the three-phase alternating current. The stable flow of the three-phase alternating current includes a state where current is stable at 0 ampere [A].

Then, at time t3, at which it is determined that the current supplied to the AC motor 2 has been stabilized and the control W-phase current detection value iw_sns has been stabilized, the control shifts to one-phase, which is a failsafe mode.

Figure 7:
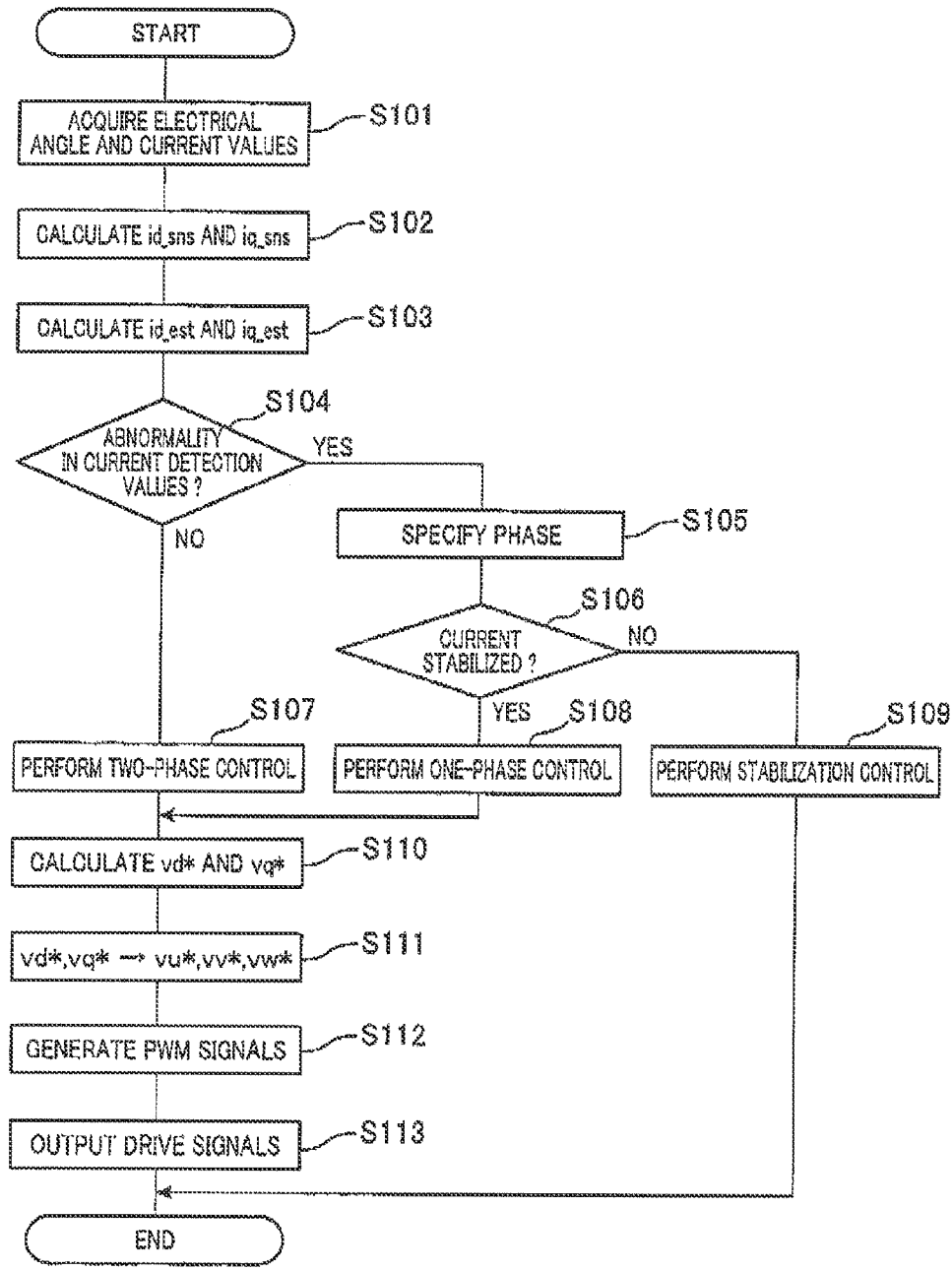
FIG. 7 is a flow diagram illustrating a motor control process, according to the first embodiment.

Referring now to the flow diagram shown in FIG. 7, a motor control process of the present embodiment is described. For example, this process is performed by the control unit 20 at predetermined intervals while the motor drive system 1 is powered on.

In first step S101, the control unit 20 acquires the electrical angle θe, control V-phase current detection value iv_sns, the monitoring V-phase current detection value iv_sns_a, the control W-phase current detection value iw_sns and the monitoring W-phase current detection value iw_sns_a.

In step S102, the current detection section 30 calculates the d-axis current detection value id_sns and the q-axis current detection value iq_sns on the basis of the control V- and W-phase current detection values iv_sns and iw_sns, and the electrical angle θe.

In step S103, the current estimation section 40 calculates the d-axis current estimate value id_est and the q-axis current estimate value iq_est on the basis of the control V- or W-phase current detection value iv_sns or iw_sns, and the electrical angle θe.

In step S104, the abnormality monitoring section 50 determines whether or not any abnormality has occurred in the control V-phase current detection value iv_sns, the monitoring V-phase current detection value iv_sns_a, the control W-phase current detection value iw_sns and the monitoring W-phase current detection value iw_sns_a. If it is determined that no abnormality has occurred in the current detection values (NO in step S104), the control proceeds to step S107. If it is determined that an abnormality has occurred in part of the current detection values (YES in step S104), the control proceeds to step S105. When an affirmative determination is made in step S104, the abnormality flag FlgE=1 is set up. Also, when an affirmative determination is made in step S104, a warning lamp is turned on, for example, to inform the user of the occurrence of the abnormality in the motor drive system 1.

In step S105, the abnormality monitoring section 50 specifies an abnormal phase and a normal phase.

In step S106, the stabilization determination section 55 determines whether or not the current supplied to the AC motor 2 has been stabilized. In the present embodiment, whether or not the current supplied to the AC motor 2 has been stabilized is determined on the basis of the integrated value SI over one cycle of current of the control W-phase current detection value iw_sns. If it is determined that the current supplied to the AC motor 2 has not been stabilized (S106: NO), that is, if the integrated value SI over one cycle of current of the control W-phase current detection value iw_sns is not within a determination range, the stabilization flag FlgS=1 is set up, and the control proceeds to step S109. If it is determined that the current supplied to the AC motor 2 has been stabilized (S107: YES), that is, if the integrated value SI over one cycle of current of the control W-phase current detection value iw_sns is within the determination range, the stabilization flag FlgS=0 is set up, and the control proceeds to step S108.

In step S107 that follows a negative determination as to the occurrence of an abnormality in the current detection values (NO in step S104), two-phase control is performed on the basis of the control V- and W-phase current detection values iv_sns and iw_sns. Specifically, the d- and q-axis current detection values id_sns and iq_sns are selected as the d- and q-axis current fixing values id_fix and iq_fix and fed back from the switching determination section 70.

In step S108 that follows an affirmative determination as to the occurrence of an abnormality in the current detection values (YES in step S104) and an affirmative determination as to the stability of the current supplied to the AC motor 2 (YES in step S106), one-phase control is performed on the basis of the control V- and W-phase current detection values iv_sns and iw_sns. Specifically, if the normal phase is the W phase, the d- and q-axis current estimate values id_est and iq_est calculated from the control W-phase current detection value iw_sns are selected as the d- and q-axis current fixing values id_fix and iq_fix and fed back from the switching determination section 70.

In step S109 that follows an affirmative determination as to the occurrence of an abnormality in the current detection values (YES in step S104) and a negative determination as to the stability of the current supplied to the AC motor 2 (NO in step S106), the stabilization control is performed. In the present embodiment, the stabilization control section 61 generates a full turn-off signal that is a drive signal to turn off all the switching elements configuring the inverter 11, and outputs the generated signal to the inverter 11. Thus, all the switching elements configuring the inverter 11 are turned off to shut down the inverter 11.

In step S110 following step S107 or S108, the PI calculation section 23 calculates the d- and q-axis voltage command values vd* and vq* on the basis of the fed-back d- and q-axis current fixing values id_fix and iq_fix.

In step S111, the d- and q-axis voltage command values vd* and vq* are subjected to reverse d-q conversion on the basis of the electrical angle θe to calculate the three-phase voltage command values vu*, vv* and vw*.

In step S112, the PWM signal generation section 25 PW-modulates the three-phase voltage command values vu*, vv* and vw* on the basis of the inverter input voltage VH to generate the drive signals UU, UL, VU, VL, WU and WL.

In step S113, the drive signals UU, UL, VU, VL, WU and WL generated in step S112 are outputted to the inverter 11. Then, based on the outputted drive signals UU, UL, VU, VL, WU and WL, the on/off operation is controlled over the switching elements of the inverter 11. In two- or one-phase control, the on/off operation of the switching elements of the inverter 11 is controlled on the basis of the drive signals UU, UL, VU, VL, WU and WL to thereby generate the three-phase AC voltages vu, vv and vw. Then, the three-phase AC voltages vu, vv and vw are applied to the AC motor 2 to output torque equivalent to the torque command value trq*.

In the present embodiment, when all of the current detection values are normal, two-phase control is performed on the basis of the control V- and W-phase current detection values iv_sns and iw_sns. By performing two-phase control, the AC motor 2 can be accurately controlled. Further, owing to the provision of the monitoring V- and W-phase current sensors 13 and 15, the current detection values detected by the current sensors 12 to 15 can be appropriately monitored as to the occurrence of an abnormality.

When an abnormality has occurred in the control V-phase current sensor 12, two-phase control is performed using the monitoring V-phase current detection value iv_sns_a detected by the monitoring V-phase current sensor 13, in place of the control V-phase current detection value iv_sns detected by the control V-phase current sensor 12. However, this disables monitoring of the monitoring V-phase current sensor 13 used for control and thus lowers monitoring performance.

When two-phase control is continued using the normal control V-phase current detection value iv_sns or monitoring V-phase current detection value iv_sns_a, it is necessary to specify which of the control V-phase current detection value iv_sns and the monitoring V-phase current detection value iv_sns_a has caused an abnormality.

Further, when both of the control V-phase current detection value iv_sns and the monitoring V-phase current detection value iv_sns_a have an abnormality due to a fault or the like in a component shared between the sensors involved, the control over the AC motor 2 can no longer be continued. The same applies to the case where an abnormality has occurred in the current sensors 13 to 15 besides the control V-phase current sensor 12.

In the present embodiment, in the event that an abnormality occurs in the current detection values, the current detection value of the phase where the abnormality has occurred is not used but the current detection value of a normal phase (the control W-phase current detection value iw_sns here) is used after control is switched to one-phase control. As described above, in the present embodiment, the sensor-phase reference current phase θx is used for calculating the current estimate value of another phase. Accordingly, one-phase control is performed with comparatively high accuracy.

By performing one-phase control, the control W-phase current detection value iw_sns used for control can be continuously monitored by the monitoring W-phase current detection value iw_sns_a which is not used for control. Accordingly, in the event that an abnormality has occurred in a part of the current detection values, monitoring performance can be retained. Further, in the present embodiment, the current detection value of an abnormal phase is not used for control. Therefore, it is not necessary to specify which of the control and monitoring current detection values is abnormal in the abnormal phase. Furthermore, in the event that both of the control and monitoring current detection values of the abnormal phase have an abnormality, the AC motor 2 can be continuously controlled.

Immediately after the occurrence of an abnormality in the control V-phase current sensor 12, control becomes unstable and thus the control W-phase current detection value iw_sns may also become unstable. In this regard, in the present embodiment, when an abnormality has been detected in the control V-phase current detection value iv_sns, the stabilization control is performed first and then, after lapse of the predetermined period after the detection of the abnormality in the control V-phase current detection value iv_sns, control is shifted to one-phase control. In this way, in the occurrence of an abnormality in the control V-phase current detection value iv_sns, control is stably shifted to one-phase control without using the control W-phase current detection value iw_sns which is unstable.

The user may have an uneasy feeling during the period of the stabilization control because the inverter 11 is shut down. However, this raises no problem because the period of shutdown is very short and because the shutdown can rather notify the user of the occurrence of an abnormality.

As described above in detail, in the motor control apparatus 10 for controlling the driving of the AC motor 2, the application voltage is controlled by the inverter 11.

The control unit 20 performs the following process.

The control unit 20 acquires the control V-phase current detection value iv_sns from the control V-phase current sensor 12 which is provided in the V phase that is one of the phases of the AC motor 2. Then, the control unit 20 acquires the control W-phase current detection value iw_sns from the control W-phase current sensor 14 which is provided in the W phase that is a phase other than the V phase. The control unit 20 acquires the monitoring V- and W-phase current detection values iv_sns_a and iw_sns_a used for monitoring an abnormality of the control V- and W-phase current detection values iv_sns and iw_sns, from the monitoring V- and W-phase current sensors 13 and 15, respectively, which are provided besides the control V- and W-phase current sensors 12 and 14. Further, the control unit 20 acquires the electrical angle θe from the rotation angle sensor 16 that detects a rotation angle of the AC motor 2 (step S101 of FIG. 7).

The current detection section 30 calculates the d- and q-axis current detection values id_sns and iq_sns on the basis of the control V- and W-phase current detection values iv_sns and iw_sns, and the electrical angle θe (step S102).

The current estimation section 40 calculates the d- and q-axis current estimate values id_est and iq_est on the basis of the control V- or W-phase current detection value iv_sns or iw_sns, and the electrical angle θe (step S103).

The abnormality monitoring section 50 monitors the occurrence of an abnormality in the control V- and W-phase current detection values iv_sns and iw_sns and the monitoring V- and W-phase current detection values iv_sns_a and iw_sns_a. Through the monitoring, the abnormality monitoring section 50 specifies an abnormal phase in which an abnormality has occurred and a normal phase in which no abnormality has occurred.

The switching determination section 70 selects the d- and q-axis current detection values id_sns and iq_sns, or selects the d- and q-axis current estimate values id_est and iq_est, as the d- and q-axis current fixing values id_fix and iq_fix. The selection is made depending on whether the control V- and W-phase current detection values iv_sns and iw_sns and the monitoring V- and W-phase current detection values iv_sns_a and iw_sns_a are normal or not.

The PI calculation section 23 calculates the d- and q-axis voltage command values vd* and vq* associated with the voltage to be applied to the AC motor 2 on the basis of the d- and q-axis current fixing values id_fix and iq_fix, and the d- and q-axis current command values id* and iq* associated with the driving of the AC motor 2 (step S110).

The PWM signal generation section 25 uses the d- and q-axis voltage command values vd* and vq*, as bases, to generate the drive signals UU, UL, VU, VL, WU and WL associated with the drive control of the inverter 11, and outputs the generated drive signals UU, UL, VU, VL, WU and WL to the inverter 11 (steps S112 and S113).

The stabilization control section 61 stabilizes the current supplied to the AC motor 2 on condition that an abnormality is detected in part of the control V- and W-phase current detection values iv_sns and iw_sns and the monitoring V- and W-phase current detection values iv_sns_a and iw_sns_a.

The stabilization determination section 55 determines whether or not the current supplied to the AC motor 2 has been stabilized after an abnormality is detected in part of the control V- and W-phase current detection values iv_sns and iw_sns and the monitoring V- and W-phase current detection values iv_sns_a and iw_sns_a.

The switching determination section 70 selects the d- and q-axis current detection values id_sns and iq_sns as the d- and q-axis current fixing values id_fix and iq_fix (step S107), on condition that the control V- and W-phase current detection values iv_sns and iw_sns and the monitoring V- and W-phase current detection values iv_sns_a and iw_sns_a are normal (NO in step S104).

After an abnormality is detected in part of the control V- and W-phase current detection values iv_sns and iw_sns and the monitoring V- and W-phase current detection values iv_sns_a and iw_sns_a (S104; YES), and if the current supplied to the AC motor 2 is determined to have been stabilized (S106: YES), the switching determination section 70 selects the d- and q-axis current estimate values id_est and iq_est, which are calculated on the basis of the normal phase current detection value (value of the normal phase), which is the control V- or W-phase current detection value iv_sns or iw_sns, as the d- and q-axis current fixing values id_fix and iq_fix (S108).

In the present embodiment, two-phase control is switched to one-phase control when an abnormality has occurred in part of the current detection values. Accordingly, abnormality monitoring of a current detection value used for one-phase control can be continued on the basis of another normal current detection value. Thus, control of the AC motor 2 can be continued without lowering the abnormality monitoring performance.

If an abnormality occurs in part of the current detection values, the abnormal current detection value is used, although temporarily, for the calculation of the d- and q-axis voltage command values vd* and vq*. In such a case, there is a concern that control may become unstable and thus other current detection values also may become unstable. In this regard, in the present embodiment, the stabilization control for stabilizing the current is performed in place of the control using the current detection values, until the current supplied to the AC motor 2 becomes stable. In other words, the stabilization control may be interpreted to be a control without using the current detection values.

Thus, the control is prevented from becoming unstable due to the use of the unstable current detection values for the calculation of the d- and q-axis voltage command values vd* and vq*. In this way, the control can be stably shifted to one-phase control that is a failsafe mode. In addition, after confirmation of the stabilization in the current supplied to the AC motor 2, the control can be timely shifted to one-phase control.

It should be noted that the state where the current supplied to the AC motor 2 is stable includes not only a state where the cyclic three-phase alternating current is supplied, but also a state where the current value is zero.

The stabilization determination section 55 determines that the current supplied to the AC motor 2 has been stabilized, on condition that an integrated value SI of a period is within a determination range that includes zero. In this case, the period corresponds to an integral multiple of a current cycle of the control W-phase current detection value iw_sns that is a current detection value of a normal phase.

Hence, the determination can be appropriately made that a stable periodical current iα supplied to the AC motor 2.

In the present embodiment, the stabilization control section 61 shuts down the inverter 11. Specifically, in place of the drive signals UU, UL, VU, VL, WU and WL, a full turn-off signal is outputted to the inverter 11 to turn off all the switching elements configuring the inverter 11.

Thus, the current of the AC motor 2 can be stabilized without passing an overcurrent therethrough.

Further, in the present embodiment, the PI calculation section 23 calculates the d- and q-axis voltage command values vd* and vq* on the basis of the d- and q-axis current fixing values id_fix and iq_fix, which are fed back, and the d- and q-axis current command values id* and iq*. Specifically, in the present embodiment, the B- and q-axis voltage command values vd* and vq* are calculated using a current feedback control process. Use of the current feedback control process contributes, in particular, to reducing torque pulsation in a low rotation range.

In the present embodiment, the control unit 20 configures the first current acquiring means (section), the second current acquiring means (section), the third current acquiring means (section), the rotation angle acquiring means (section), the two-phase control current value calculating means (section), the one-phase control current value calculating means (section), the abnormality monitoring means (section), the switching means (section), the voltage command value calculating means (section), the drive control means (section), the stabilization control means (section), and the stabilization determination means (section). More specifically, the current detection section 30 configures the two-phase control current value calculating means (section), and the current estimation section 40 configures the one-phase control current value calculating means (section). Further, the abnormality monitoring section 50 configures the abnormality monitoring means (section), the switching determination section 70 configures the switching means (section), the PI calculation section 23 configures the voltage command value calculating means (section), and the PWM signal generation section 25 configures the drive control means (section). In addition, the stabilization control section 61 configures the stabilization control means (section), and the stabilization determination section 55 configures the stabilization determination means (section).

Furthermore, step S101 of FIG. 7 corresponds to the function of the first current acquiring means (section), the second current acquiring means (section), the third current acquiring means (section) or the rotation angle acquiring means (section). Step S102 corresponds to the function of the two-phase control current value calculating means (section), and step S103 corresponds to the function of the one-phase control current value calculating means (section). Further, steps S104 and 105 correspond to the function of the abnormality monitoring means (section). Steps S107 and S108 correspond to the function of the switching means (section). Step S110 corresponds to the function of the voltage command value calculating means (section). Steps S112 and S113 correspond to the function of the drive control means (section). Step S109 corresponds to the function of the stabilization control means (section). Step S106 corresponds to the function of the stabilization determination means (section).

In the present embodiment, the V phase corresponds to the first phase, the control V-phase current sensor 12 corresponds to the first current sensor, and the control V-phase current detection value iv_sns corresponds to the first current detection value. Also, the W phase corresponds to the second phase, the control W-phase current sensor 14 corresponds to the second current sensor, and the control W-phase current detection value iw_sns corresponds to the second current detection value. Further, the monitoring V- and W-phase current sensors 13 and 15 correspond to the third current sensor, and the monitoring V- and W-phase current detection values iv_sns_ and iw_sns_a correspond to the third current detection value. Specifically, in the present embodiment, the current detection values detected by the first sensor and the second sensor are used for control, while the current detection value detected by the third current sensor is used for monitoring.

Furthermore, the electrical angle θe corresponds to the rotation angle detection value, the d- and q-axis current detection values id_sns and iq_sns correspond to the two-phase control current value, the d- and q-axis current estimate values id_est and iq_est correspond to the one-phase control current value, and the d- and q-axis current fixing values id_fix and iq_fix correspond to the current fixing value. In addition, the d- and q-axis current command values id* and iq* correspond to the command value and the current command value, the d- and q-axis voltage command values vd* and vq* correspond to the voltage command value, and the drive signals UU, UL, VU, VL, WU and WL correspond to the drive signal.

Second Embodiment

Figure 8:
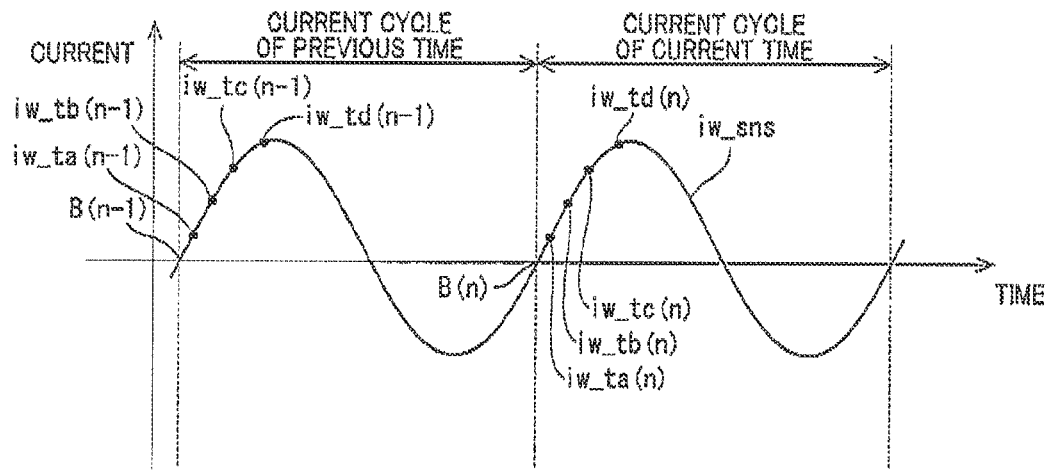
FIG. 8 is an explanatory diagram illustrating stabilization determination, according to a second embodiment.

Referring to FIG. 8, a second is described. The second embodiment differs from the first embodiment in the stabilization determination process of the stabilization determination section 55, which is mainly described. As in the above embodiment, an example is described in which the control V-phase current detection value iv_sns is abnormal and the normal phase is the W phase.

As shown in FIG. 8, in the present embodiment, a value in a current cycle (electricity cycle) of current time (present time, this time) (hereinafter, referred to "current-time cyclic value") of the control W-phase current detection value iW_sns is compared with a current cycle of previous time (hereinafter, referred to "previous-time cyclic value") of the control W-phase current detection value iW_sns.

For example, if the previous-time cyclic value from a base point B(n−1) of the current cycle of previous time to a predetermined timing ta is iw_ta(n−1), and the current-time cyclic value from a base point B(n) of the current cycle of current time to the predetermined timing ta is iw_ta(n), iw_ta(n−1) is compared with iw_ta(n). If the difference between the previous-time cyclic value and the current-time cyclic value, that is, |iw_ta(n−1)−iw_ta(n)| is equal to or less than the first determination threshold X1, the current supplied to the AC motor 2 is determined to have been stabilized. The first determination threshold X1 is set to a value comparatively approximate to zero, taking account of a sensor error or the like.

Similarly, a previous-time cyclic value iw_tb(n−1) at a predetermined timing tb is compared with a current-time cyclic value iw_tb(n) at the predetermined timing tb. A previous-time cyclic value iw_tc(n−1) at a predetermined timing tc is compared with a current-time cyclic value iw_tc(n) at the predetermined timing tc. A previous-time cyclic value iw_td(n−1) at a predetermined timing td is compared with a current-time cyclic value iw_td(n) at the predetermined timing td.

In FIG. 8, an example is illustrated in which four pairs of the previous-time cyclic value and the current-time cyclic value are compared. However, the determination may be made on the basis of the difference between one pair of the previous-time cyclic value and the current-time cyclic value, or a plurality of pairs of the previous-time cyclic value and the current-time cyclic value. The previous-time cyclic value and the current-time cyclic value may be compared with each other over one cycle of current. If the ratio of a period, during which the difference between the previous-time cyclic value and the current-time cyclic value is equal to or less than the first determination threshold X1, to one cycle of current is equal to or more than a predetermined ratio, the current supplied to the AC motor 2 may be determined to have been stabilized. Alternatively, if the difference between the previous-time cyclic value and the current-time cyclic value is continuously equal to or less than the first determination threshold X1 at predetermined times, the current supplied to the AC motor 2 may be determined to have been stabilized.

In the present embodiment, if the difference between the current-time cyclic value, which is a normal phase current detection value of the current cycle of current time, and the previous-time cyclic value, which is a normal phase current detection value at the timing corresponding to the current-time cyclic value of the current cycle of previous time, is equal to or less than the first determination threshold X1, the stabilization determination section 55 determines that the current supplied to the AC motor 2 has been stabilized.

Hence, the determination can be appropriately made that a stable periodical current is supplied to the AC motor 2.

The present embodiment can provide advantages similar to those of the first embodiment.

Third Embodiment

Figure 9:
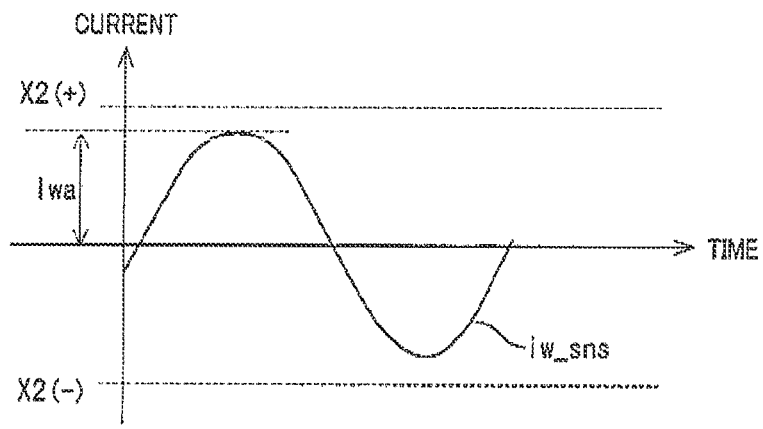
FIG. 9 is an explanatory diagram illustrating stabilization determination, according to a third embodiment.

Referring to FIG. 9, a stabilization determination process according to a third embodiment is described.

As shown in FIG. 9, if an amplitude Iwa of the control W-phase current detection value iw_sns is equal to or less than a second determination threshold X2, the stabilization determination section 55 of the present embodiment determines that the current supplied to the AC motor 2 has been stabilized. Note that, in FIG. 9, a positive-side determination threshold is indicated by "X2(+)", and a negative-side determination threshold is indicated by "X2(−)". The second determination threshold X2 is set to a value corresponding to an amplitude by which the control W-phase current detection value iw_sns does not become an overcurrent.

Hence, the determination can be appropriately made that not an overcurrent but a stable current iα supplied to the AC motor 2.

The present embodiment can provide advantages similar to those of the first and second embodiments.

Fourth Embodiment

Figure 10:
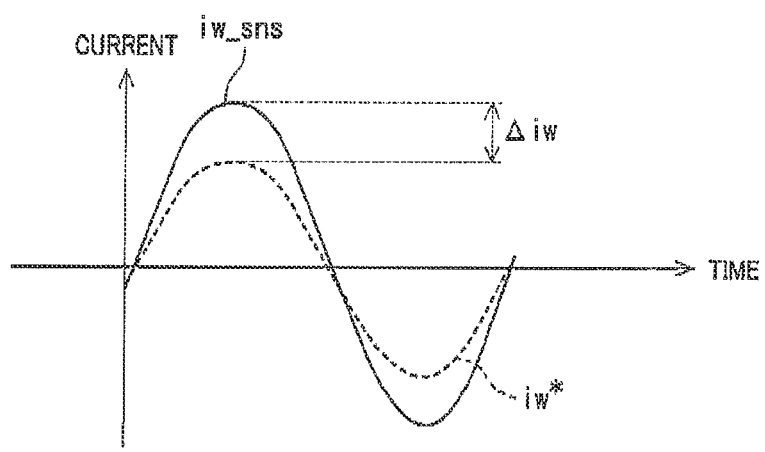
FIG. 10 is an explanatory diagram illustrating stabilization determination, according to a fourth embodiment.

Referring to FIG. 10, a stabilization determination process according to a fourth embodiment is described.

As shown in FIG. 10, in the present embodiment, if the error Δiw between the W-phase current command value iw* and the control W-phase current detection value iw_sns is equal to or less than a third determination threshold X3, it is assumed that the W-phase current command value iw* coincides with the control W-phase current detection value iw_sns. In this case, since a current according to the command has been supplied to the AC motor 2, it is determined that the current supplied to the AC motor 2 has been stabilized.

The W-phase current command value iw* used for the comparison with the control W-phase current detection value iw_sns is calculated through reverse d-q conversion based on the d- and q-axis current command values id* and iq*.

According to the present embodiment, the third determination threshold X3 is set to a value comparatively approximate to zero, taking account of a sensor error, a calculation error or the like.

In the present embodiment, if the error between the current command value of the normal phase and the normal phase current detection value is equal to or less than the third determination threshold X3, the stabilization determination section 55 determines that the current supplied to the AC motor 2 has been stabilized. Hence, the determination can be appropriately made that a stable current according to the command is supplied to the AC motor 2.

The present embodiment can provide advantages similar to those of the first to third embodiments.

Note that if the difference between the amplitudes of the W-phase current command value iw* and the control W-phase current detection value iw_sns is equal to or less than the fifth determination threshold X5, it may be assumed that the current command value of the normal phase coincides with the normal phase current detection value. Alternatively, if the ratio between the W-phase current command value iw* and the control W-phase current detection value iw_sns or the ratio between the amplitudes is within a predetermined range including 1, it may be assumed that "the current command value of the normal phase coincides with the normal phase current detection value."

Fifth Embodiment

Referring to FIGS. 11 to 14, an fifth embodiment is described.

The embodiments set forth above have been described focusing on the current feedback control process in which the d- and q-axis current fixing values id_fix and iq_fix are fed back, and the d- and q-axis voltage command values vd* and vq* are calculated on the basis of the fed-back d- and q-axis current fixing values id_fix and iq_fix and the d- and q-axis current command values id* and iq*.

Figure 11:
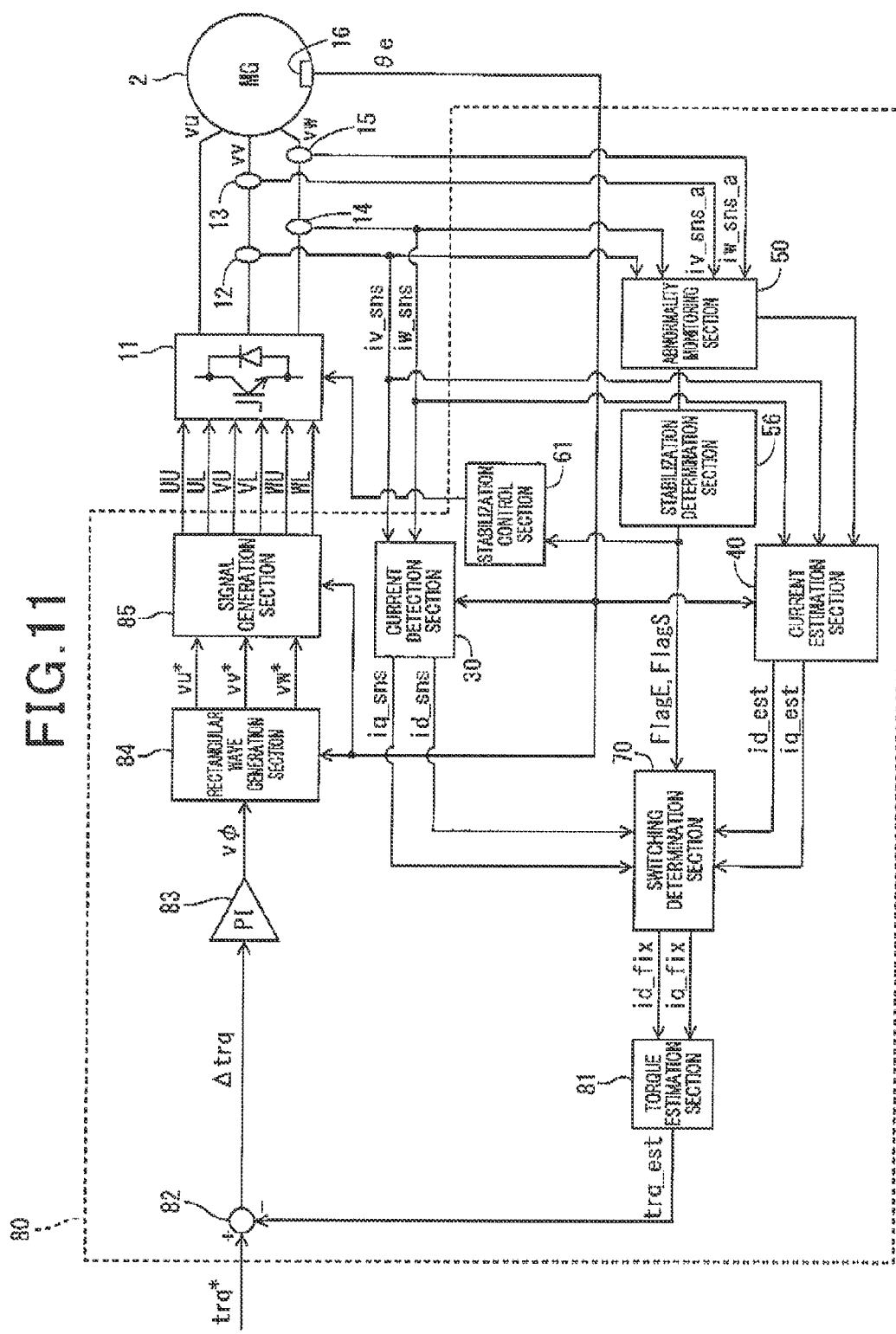
FIG. 11 is a block diagram illustrating a configuration of a control unit, according to a fifth embodiment.

It is true that the current feedback control process can mitigate torque pulsation but, as disclosed in JP-A-2010-124544, the available voltage utilization ratio is lower in the current feedback control process. In this regard, the present embodiment employs a torque feedback control process, as shown in FIG. 11, to increase the voltage utilization ratio. FIG. 11 is a block diagram illustrating a configuration of a control unit 80 according to the fifth embodiment.

The torque feedback control process of the present embodiment is realized, for example, as a rectangular wave control mode. In the rectangular wave control mode, a rectangular wave of one pulse is applied to the AC motor 2, the rectangular wave having a ratio of 1:1 between a high-level period and a low-level period in one current cycle (rectangular wave pulse pattern). Use of the rectangular wave control mode can further enhance the voltage utilization ratio than in an overmodulation PWM control mode.

Referring to FIG. 11, details of the control unit 80 of the present embodiment are described.

The control unit 80 includes a torque estimation section 81, a subtractor 82, a PI calculation section 83, a rectangular wave generation section 84, a signal generation section 85, a current detection section 30, a current estimation section 40, an abnormality monitoring section 50, a stabilization determination section 56, a stabilization control section 61 and a switching determination section 70.

The torque estimation section 81 calculates a torque estimate value trq_est using a map or a formula, for example, on the basis of the d- and q-axis current fixing values id_fix and iq_fix. The calculated torque estimate value trq_est is fed back to the subtractor 82.

The subtractor 82 calculates a torque deviation Δtrq that is the difference between the torque estimate value trq_est fed back from the torque estimation section 81 and the torque command value trq*.

In order that the torque estimate value trq_est conforms to the torque command value trq*, the PI calculation section 83 calculates a voltage command phase vφ serving as a voltage command value, using PI calculation, so that the torque deviation Δtrq converges on zero.

The rectangular wave generation section 84 generates a rectangular wave on the basis of the voltage command phase vφ and the electrical angle θe, and outputs the U-, V- and W-phase voltage command values vu*, vv* and vw*.

The signal generation section 85 calculates the drive signals UU, UL, VU, VL, WU and WL associated with the on-off switching of the switching elements of the inverter 11, on the basis of the U-, V- and W-phase voltage command values vu*, vv* and vw* and the inverter input voltage VH that is a voltage applied to the inverter 11.

Then, based on the drive signals UU, UL, VU, VL, WU and WL, the on/off state of the switching elements of the inverter 11 is controlled to thereby generate the three-phase AC voltages vu, vv and vw. The three-phase AC voltages vu, vv and vw are applied to the AC motor 2 to control the driving of the AC motor 2 such that the torque equivalent to the torque command value trq* is outputted.

In the rectangular wave control mode, the d- and q-axis current command values id* and iq* are not used for calculating the voltage commands. Therefore, in the calculation of the d- and q-axis current estimate values id_est and iq_est performed by the current estimation section 40, it is desirable to employ a process, such as the "(iii) Calculation based on derivation of the α-axis current" or the "(iv) Calculation based on recurrence formula", which does not use the d- and q-axis current command values id* and iq*, as described in another embodiment. Further, although not used for the calculation of the voltage command phase vφ, the d- and q-axis current commands id* and iq* may be separately calculated, so that these command values can be used for the calculation of the d- and q-axis current estimate values id_est and iq_est by the current estimation section 40, along the process of using these command values, as described in the first embodiment.

As in the case of the stabilization determination section 55 of the above embodiment, when an abnormality has been detected in the current detection value by the abnormality monitoring section 50, the stabilization determination section 56 determines whether or not the current supplied to the AC motor 2 is stable. Although the stabilization determination process may be similar to that of the above embodiment, hereinafter, a stabilization determination process using voltage equations is described.

Figure 12:
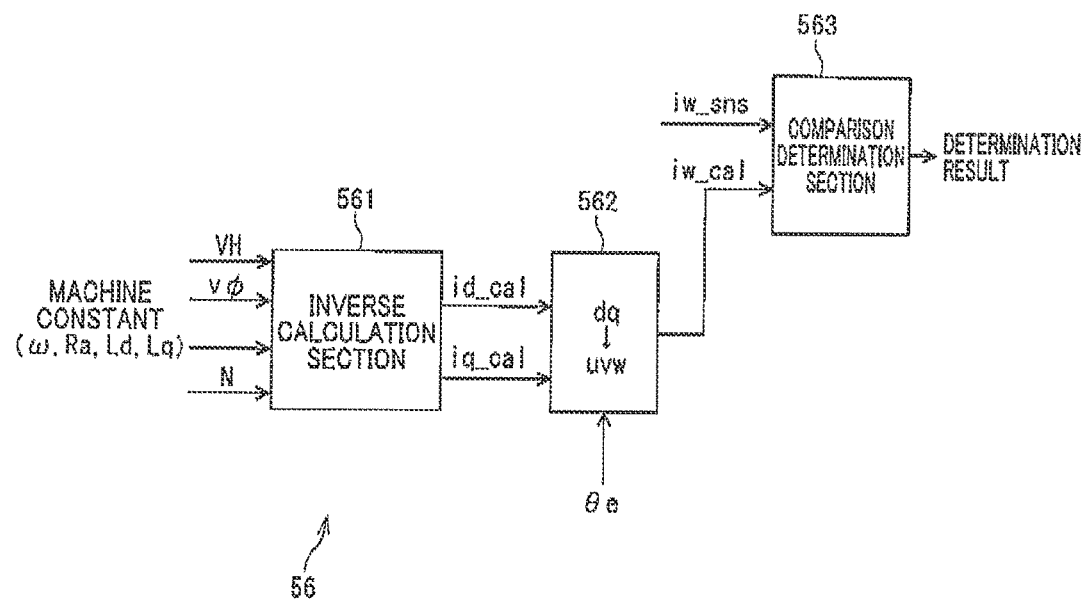
FIG. 12 is a block diagram illustrating a stabilization determination section, according to the fifth embodiment.

FIG. 12 shows the stabilization determination section 56 according to the fifth embodiment in detail.

The stabilization determination section 56 includes an inverse calculation section 561, a reverse d-q conversion section 562, and a comparison determination section 563.

The inverse calculation section 561 performs inverse calculation using the voltage equations, which are theoretical formulas of a motor, to calculate a d-axis current calculation value id_cal and a q-axis current calculation value iq_cal on the basis of an inverter input voltage VH, a voltage command phase vφ, a machine constant, and the rotation number N. The voltage command phase vφ can be calculated, for example, by referring to a voltage command phase map stored in advance on the basis of the torque command value trq*, the rotation number N, and the inverter input voltage VH.

The voltage equations of a motor are generally expressed by the following Formulas (14) and (15).

$$vd = Ra \times id + Ld \times (d/dt)id - \omega \times Lq \times iq \tag{14}$$

$$vq = Ra \times iq + Lq \times (d/dt)iq + \omega \times Ld \times id + \omega \times \phi \tag{15}$$

Ignoring the time derivative (d/dt) terms expressing transient characteristics, Formulas (14) and (15) can be rewritten into Formulas (16) and (17).

$$vd = Ra \times id - \omega \times Lq \times iq \tag{16}$$

$$vq = Ra \times iq + \omega \times Ld \times id + \omega \times \phi \tag{17}$$

In the formulas, the symbols represent matters as follows.
Ra: armature resistance
Ld: d-axis self-inductance
Lq: q-axis self-inductance
ω: electrical angular velocity
ψ: armature interlinkage flux of the permanent magnets It should be noted that fixed values may be used for the armature resistance Ra as a machine constant of the AC motor 2, the d- and q-axis self-inductances Ld and Lq, and the armature interlinkage flux ψ, or alternatively, these values may be obtained through calculations.

The electrical angular velocity ω is calculated on the basis of the electrical angle θe. Alternatively, electrical angular velocity ω may be calculated from the rotation number N.

When the voltage command phase vφ is available, the d-axis voltage Vd and the q-axis voltage Vq can be calculated by separating a voltage vector VH∠vφ into a sin component and a cos component. Hence, the inverse calculation section 561 uses the d-axis voltage Vd and the q-axis voltage Vq to calculate id and iq in Formulas (16) and (17) as the d-axis current calculation value id_cal and the q-axis current calculation value iq_cal, respectively, through the inverse calculation using the voltage equations.

The reverse d-q conversion section 562 calculates a normal phase current calculation value by performing reverse d-q conversion with respect to the d-axis current calculation value id_cal and the q-axis current calculation value iq_cal, which are calculated by the inverse calculation section 561, on the basis of the electrical angle θe. Hereinafter, as in the above first embodiment, an example is described in which the normal phase is the W phase. Hence, a W-phase current calculation value iw_cal is calculated.

The comparison determination section 563 compares the W-phase current calculation value iw_cal with the control W-phase current detection value iw_sns to determine whether or not the current supplied to the AC motor 2 has been stabilized.

Figure 13:
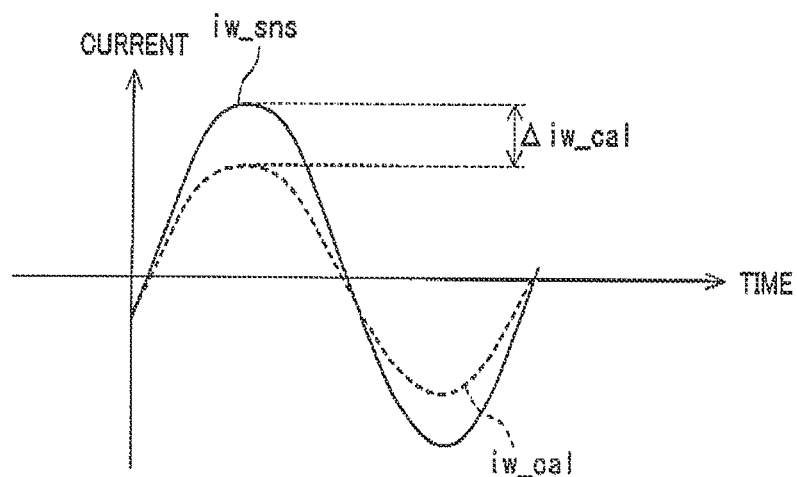
FIG. 13 is an explanatory diagram illustrating stabilization determination, according to the fifth embodiment.

Referring now to FIG. 13, a stabilization determination process of the comparison determination section 563 is described. As shown in FIG. 13, if the error Δiw_cal between the W-phase current calculation value iw_cal and he control W-phase current detection value iw_sns is equal to or less than a fourth determination threshold X4, the comparison determination section 563 determines that the current supplied to the AC motor 2 has been stabilized. The fourth determination threshold X4 is set to a value comparatively approximate to zero, taking account of a sensor error, a calculation error or the like.

If the error Δiw_cal is equal to or less than the fourth determination threshold X4, the comparison determination section 563 determines that the current supplied to the AC motor 2 has been stabilized. If the comparison determination section 563 determines that the current supplied to the AC motor 2 has been stabilized, the determined result, that is, the stabilization flag FlgS=0 is outputted to the stabilization control section 61 and the switching determination section 70 (see FIG. 11). If the comparison determination section 563 determines that the current supplied to the AC motor 2 has not been stabilized, the determined result, that is, the stabilization flag FlgS=1 is outputted to the stabilization control section 61 and the switching determination section 70.

Figure 14:
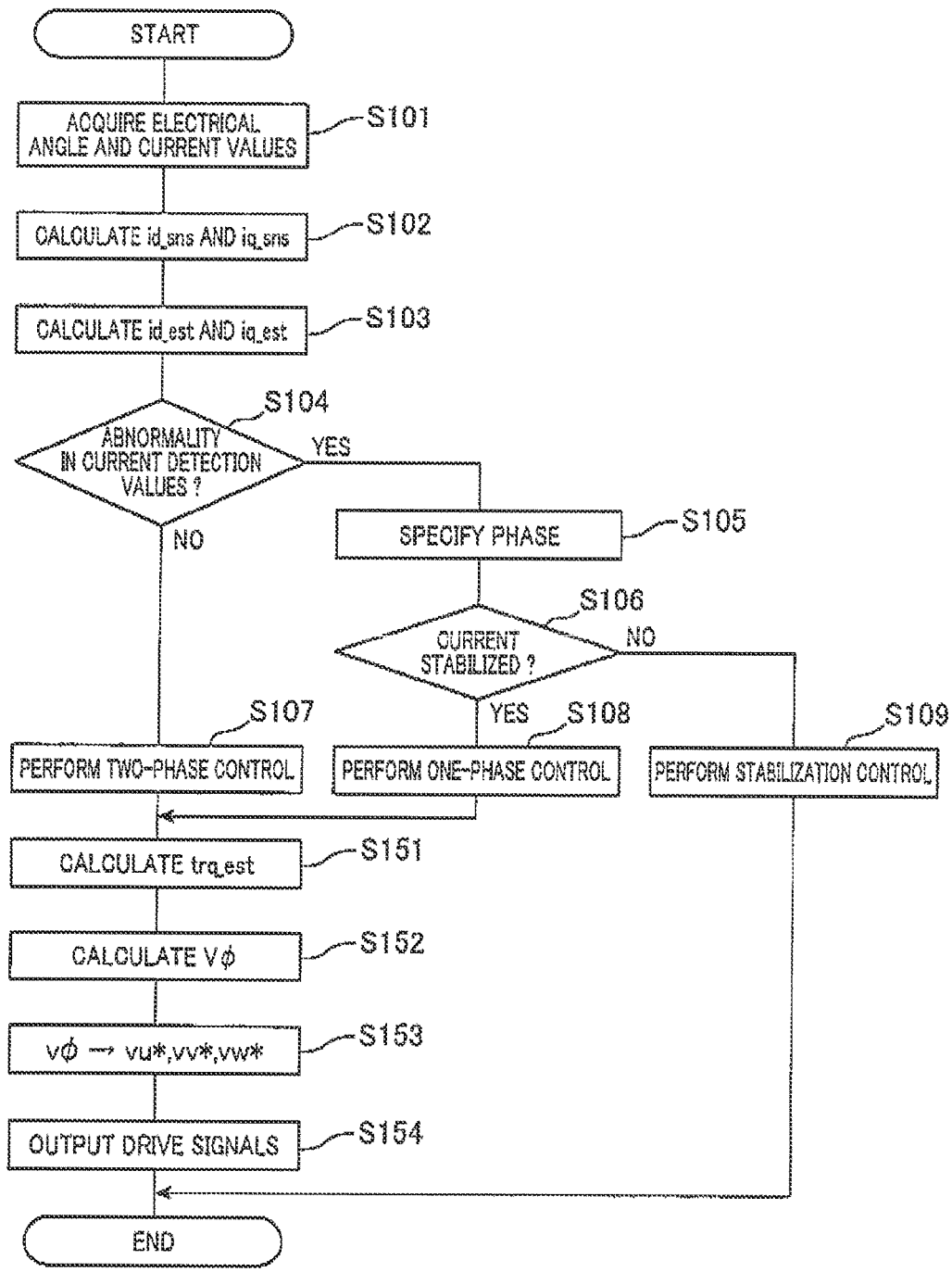
FIG. 14 is a flow diagram illustrating a motor control process, according to the fifth embodiment.

Referring to FIG. 14, a motor control process of the present embodiment is described. FIG. 14 is a flow diagram illustrating the motor control process.

In the flow diagram of FIG. 14, steps S101 to S109 are similar to those of FIG. 7. In FIG. 14, steps S151 to S154 are performed alternative to steps S110 to S113 of FIG. 7. Accordingly, the following description is focused on steps S151 to S154.

In step S151, which follows step S107 or S108, the torque estimation section 81 calculates the torque estimate value trq_est on the basis of the d- and q-axis current fixing values id_fix and iq_fix.

In step S152, the subtractor 82 calculates the torque deviation Δtrq on the basis of the torque command value trq* and the fed-back torque estimate value trq_est. Then, the PI calculation section 83 calculates the voltage command phase vφ so that the torque deviation Δtrq converges to zero.

In step S153, the rectangular wave generation section 84 calculates the three-phase voltage command values vu*, vv* and vw* on the basis of the voltage command phase vφ.

In step S154, based on the three-phase voltage command values vu*, vv* and vw* and the inverter input voltage VH, the signal generation section 85 generates the drive signals UU, UL, VU, VL, WU and WL and outputs the generated drive signals to the inverter 11.

If the error between the W-phase current calculation value iw_cal, which is a current value of the normal phase calculated using theoretical formulas of a motor, and the W-phase current detection value iw_sns is equal to or less than the fourth determination threshold X4, the stabilization determination section 56 of the present embodiment determines that the current supplied to the AC motor 2 has been stabilized. Hence, the determination can be appropriately made that a stable current is supplied to the AC motor 2.

In the present embodiment, the control unit 80 further includes the torque estimation section 81 which calculates the torque estimate value trp_est on the basis of the d- and q-axis current fixing values id_fix and iq_fix.

Further, the PI calculation section 83 calculates the voltage command phase vφ on the basis of the fed-back torque estimate value trq_est and the torque command trq*.

In the present embodiment, a torque feedback control process is used to perform rectangular wave control, which leads to enhancing the voltage utilization ratio. In the torque feedback control process, the torque estimate value trq_est to be fed back is estimated from the d- and q-axis current fixing values id_fix and iq_fix. Accordingly, the torque feedback control process may be interpreted to be a current feedback control in a broad sense.

The present embodiment provides the advantageous effects similar to those of the foregoing embodiment.

In the present embodiment, similar to the control unit 20, the control unit 80 configures various means (section). The correspondence provided below is what is different from the first embodiment.

The torque estimation section 81 configures the "torque estimating means (section)", the PI calculation section 83 configures the "voltage command value calculating means (section)", and the signal generation section 85 configures the "drive control means (section)".

Further, step S161 of FIG. 19 corresponds to the function of the "torque estimating means (section)", step S162 corresponds to the function of the "voltage command value calculating means (section)", and step S164 corresponds to the function of the "drive control means (section)".

In addition, the torque command value trq* corresponds to the "command value" and the "torque command value", and the voltage command phase vφ corresponds to the "voltage command value". The W-phase current calculation value iw_cal corresponds to the "normal phase current calculation value."

Other Embodiments (A) Current Sensors

In the embodiments described above, the current sensors for control and monitoring are provided to the V and W phases, with the V phase corresponding to the "first phase" and with the W phase corresponding to the "second phase". In another embodiment, the U phase, instead of the V and W phases, may be provided with the current sensors for control and monitoring. That is, the U phase may be the "first phase" and the V or W phase may be the "second phase".

In the embodiments described above, the first and second current sensors serving as the current sensors for control, and the third current sensor serving as the current sensor for monitoring are provided to the same phase. In another embodiment, on the premise of providing the first and second current sensors for control to different phases, the third current sensor for monitoring may be provided to any phase. Further, the number of the third current sensor is not limited to two but may be one or three or more.

For example, each of the three phases may be provided with one current sensor and, when all the current sensors are normal, two may be used for control and one may be used for monitoring. In this case, if the current detection value of one current sensor is abnormal, one of the two normal current sensors may be used for control and the other may be used for monitoring. This establishes one-phase control, while abnormality monitoring is continuously performed.

(B) Motor Control Process

In the embodiments described above, the d- and q-axis current detection values id_sns and iq_sns and the d- and q-axis current estimate values id_est and iq_est are calculated, irrespective of the presence/absence of an abnormality in the current detection values.

In another embodiment, the d- and q-axis current detection values id_sns and iq_sns may be calculated when all of the current detection values are normal and, if an abnormality is detected in part of the current detection values, the d- and q-axis current estimate values id_est and iq_est may be calculated on the basis of the current detection values of normal phases. Alternatively, the d- and q-axis current estimate values id_est and iq_est may be ensured to be calculated after lapse of the predetermined period from the detection of an abnormality in the current detection values. Specifically, in the example shown in FIG. 7, if a negative determination is made at step S104, the calculation of step S102 may be performed and, if an affirmative determination is made at step S104 or step S106, the calculation of step S103 may be performed. The same applies to other embodiments.

(C) Current Estimating Means (Section)

In the embodiments described above, the d- and q-axis current estimate values id_est and iq_est are calculated on the basis of the d- and q-axis current command values id* and iq* and the sensor-phase reference current phase θx that is based on the a axis serving as a sensor phase axis. In another embodiment, the current values for one-phase control may be calculated using any process as far as the calculation process is based on the first or second current detection value and the rotation angle detection value. Further, the current values for one-phase control may be calculated by additionally using different parameters, or without using the current command values or the sensor-phase reference current phase θx.

Calculation processes usable as the current value calculating means (section) for one-phase control are exemplified below.

(i) Calculation Based on Reference Angle and Amplitude, Using Current Command Phase For example, as disclosed in JP-A-2004-159391, a U-phase current estimate value may be divided by a U-phase current reference angle (θ') produced from a current command phase angle and an electrical angle to calculate a current amplitude (Ia). Then, this current amplitude may be multiplied by a sine value in an electrical angle that is deviated by ±120° from the U-phase current reference angle to calculate current estimate values Iv and Iw of other two phases (Formulas 14.1 to 14.3).

$$Ia = Iu/[\sqrt{(1/3)} \times \{-\sin(\theta')\}] \qquad (14.1)$$

$$Iv = \sqrt{(1/3)} \times Ia \times \{-\sin(\theta' + 120°)\} \qquad (14.2)$$

$$Iw = \sqrt{(1/3)} \times Ia \times \{-\sin(\theta' + 240°)\} \qquad (14.3)$$

(ii) Calculation Assuming Current Command Values to be Current Estimate Values of Other Phases In (ii) to (iv) below, a sensor phase is the W phase, and the current detection value of the W phase used for control is simply referred to as W-phase current detection value iw_sns.

In the phases other than the sensor phase, current command values are regarded as estimate values, and current estimate values are calculated. For example, if a sensor phase is the W phase, the U- and V-phase current command values iu* and iv* calculated through reverse d-q conversion based on the d- and q-axis current command values id* and iq* are assumed to be the U- and V-phase current estimate values iu_est and iv_est. Then, by performing d-q conversion with respect to the U- or V-phase current estimate value iu_est or iv_est and the W-phase current detection value iw_sns, the d- and q-axis current estimate values id_est and iq_est are calculated.

(iii) Calculation Based on Derivation of α-Axis Current

Taking account that the α-axis current iα and the β-axis current iβ are in a relationship of "sine wave and cosine wave" and that a phase difference between the α-axis current iα and the β-axis current iβ is 90°, a β-axis current estimate value iβ_est is calculated on the basis of an α-axis current derivative value Δiα. When the calculation in the control unit is based on a discrete system, the α-axis current derivative value Δiα is delayed from the actual β-axis current iβ by a half of an electrical angle displacement Δθe. Taking account of this, it is preferable that an average value of the previous-time value and the current-time value of the α-axis current iα is multiplied by a half of the electrical angle displacement Δθe (Δθe/

2) to obtain a correction amount H, and that the β-axis current estimate value iβ_est is corrected by the correction amount H. Then, using the α-axis current iα and the corrected β-axis current estimate value iβ_est, the sensor-phase reference current phase θx is calculated. The calculation afterward is similar to those of the above embodiments.

(iv) Calculation Based on Recurrence Formula

Making use of the relative rotation of the W-phase axis on the d-q coordinate that is a rotary coordinate system, a W-phase estimate error Δiw_est is integrated to asymptotically approximate the d- and q-axis current estimate values id_est and iq_est to d- and q-axis actual current values id and iq.

A W-phase current reference value iw_bf that is a sensor-phase component is calculated on the basis of the previous-time d- and q-axis current estimate values id_est and iq_est and current-time electrical angle θe. Then, the W-phase estimate error Δiw_est is calculated, which is the difference between the W-phase current reference value iw_bf and the W-phase current detection value iw_sns. The W-phase estimate error Δiw_est is multiplied by a gain K that is a filter element to obtain a corrected error KΔiw_est. Then, based on Δiu=0 and Δiv=0, d-q conversion is performed to calculate d- and q-axis correction values id_crr and iq_crr. The calculated d- and q-axis correction values id_crr and iq_crr are rendered to be correction vectors in a sensor-phase direction, and the correction vectors are integrated in the d-q coordinate to calculate the d- and q-axis estimate values id_est and iq_est. Alternatively, an orthogonal correction value that is orthogonal to the sensor phase may be further calculated. Then, a combined vector resulting from the sensor-phase direction correction value and the orthogonal correction value may be used as a correction vector. Then, the correction vector may be integrated in the d-q coordinate.

(D) Stabilization Control Means (Section)

In the embodiments described above, a means (section) for shutting down the inverter has been described as the stabilization control means (section).

In other embodiments, methods other than shutting down the inverter may be used as the stabilization control means. For example, by using voltage equations, which are theoretical formulas of a motor, the d- and q-axis voltage command values vd* and vq* may be calculated on the basis of the d- and q-axis current command values id* and iq*. Alternatively, by referring to a voltage command map stored in advance, the d- and q-axis voltage command values vd* and vq* may be calculated on the basis of the torque command value trq* or the d- and q-axis current command values id* and iq*.

Instead of the d- and q-axis voltage command values vd* and vq*, the U-phase voltage command value vu*, the V-phase voltage command value vv* and the W-phase voltage command value vw* may be calculated on the basis of the voltage equations, which are theoretical formulas of a motor, and the voltage command map.

That is, a feedforward control without using current detection values may be used as the stabilization control. Accordingly, a voltage suitable for driving of the AC motor 2 is applied to the AC motor 2. The application of the voltage prevents the occurrence of a current flow due to a counter-electromotive force, which would otherwise have been caused depending on the inverter input voltage VH and the rotation number N.

The stabilization control means may refer to a voltage pulse pattern map stored in advance, on the basis of the torque command value trq* or the d- and q-axis current command values id* and iq* to calculate the drive signals UU, UL, VU, VL, WU and WL. Thus, the current of the AC motor 2 can be stabilized without passing an overcurrent therethrough.

In addition, a clutch serving as a connecting/disconnecting means (section) is provided which is able to switch a state where the torque of the AC motor is transmitted to the axle shaft, to a state where the torque of the AC motor is not transmitted to the axle shaft, or vice versa. The stabilization control means may control the clutch to physically disconnect the AC motor and the axle shaft so that the torque of the AC motor is not transmitted to the axle shaft. Thus, unwanted torque due to unstable control of the AC motor, which is ascribed to the abnormality that has occurred in the current sensors, is prevented from being transmitted to the axle shaft.

The stabilization control method for stabilizing the current applied to the AC motor is not limited to the above.

(E) Stabilization Determining Means (Section)

In the above embodiments, the stabilization determination means determines whether or not the current supplied to the AC motor has been stabilized on the basis of the integrated value of the normal phase current detection value, the result of the comparison between the current-time cyclic value and the previous-time cyclic value of the normal phase current detection value, the amplitude of the normal phase current detection value, the result of the comparison between the current command value of the normal phase and the normal phase current detection value, or the result of the comparison between the normal phase current estimate value inversely calculated using voltage equations and the normal phase current detection value. In other embodiments, whether or not the current supplied to the AC motor has been stabilized may be determined by any method. Alternatively, a plurality of determination methods may be combined.

(F) In the embodiments described above, the current detection values, the current estimate values, the current fixing values, the current command values and the voltage command values are described as being mainly indicated on a d-q coordinate. In another embodiment, values in use may be derived from the individual phases or may be based on other axes, as far as the values can be used for the control of the AC motor.

The voltage command values are not limited to the commands associated with voltage values, but may be any values, such as voltage command phases used in a torque feedback process, or amplitudes of the voltage commands, as far as the commands are associated with the voltage applied to the inverter. Further, the voltage command values may be calculated using any calculation method as far as the calculation is based on command values associated with the driving of the AC motor (e.g., current command values or torque command values). Other parameters or the like may be used as the voltage command values.

In the embodiments described above, the "command values associated with the driving of the AC motor" are current commands in the current feedback control process, and torque commands in the torque feedback control process. In another embodiment, the "command values associated with the driving of the AC motor" may be any command values as far as the command values are associated with the driving of the AC motor.

(G) In the first to fourth embodiments, the voltage commands are calculated on the basis of the current feedback control process. In the fifth embodiment, the voltage command values are calculated on the basis of the torque feedback process. In another embodiment, the inverter that controls the application voltage of the AC motor may be controlled by any method. Alternatively, the current feedback control process described in the first to fourth embodiments may be appropriately switched to the torque feedback control process described in the eighth to tenth embodiments, or vice versa, depending such as on the number of rotations or torque of the AC motor.

(H) In the embodiments described above, the rotation angle sensor detects the electrical angle θe and outputs the detected electrical angle θe to the control unit. In another embodiment, the rotation angle sensor may detect a mechanical angle θm and outputs the detected mechanical angle θm to the control unit, so that the mechanical angle θm is converted to the electrical angle θe in the control unit. Alternative to the electrical angle θe, the mechanical angle θm may be used as the "rotation angle detection value". In addition, the rotation number N may be calculated on the basis of the mechanical angle θm.

(I) In the embodiments described above, the AC motor is a permanent magnet synchronous three-phase AC motor. In another embodiment, the AC motor may be an induction motor or a different synchronous motor. Further, the AC motor of the above embodiments is a so-called motor-generator that functions as both a motor and a generator. In another embodiment, the AC motor may be a motor without having a function of a generator.

The AC motor may be configured to serve as a motor for an engine, which starts up the engine. Alternatively, no engine may be provided. In addition, a plurality of AC motors may be provided, with further provision of a power dividing mechanism, for example, which divides the power of the plurality of AC motors.

In addition, the AC motor is not limited a three-phase AC motor but may be a polyphase (multiphase) AC motor such as a five-phase AC motor.

(J) The application of the control unit of the AC motor control apparatus is not limited to the system, as in the above embodiments, in which a set of an inverter and an AC motor is provided. The control unit may be applied to a system which is provided with two or more sets of an inverter and an AC motor. The control unit may be applied to a system such as of an electric train, in which a plurality of AC motors are connected to a single inverter in parallel.

The control unit of the AC motor control apparatus in the above embodiments has been applied to an electric vehicle, but may be applied to configurations other than an electric vehicle.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a control apparatus (10) for an AC motor (2) is provided. The control apparatus controls driving of a polyphase AC motor in which applied voltage is controlled by an inverter (11). The apparatus includes a first current acquiring section (20, 80), a second current acquiring section (20, 80), a third current acquiring section (20, 80), a rotation angle acquiring section (20, 80), a two-phase control current value calculating section (30), an one-phase control current value calculating section (40), an abnormality monitoring section (50), a switching section (70), a voltage command value calculating section (23), a drive control section (25), a stabilization control section (61), and a stabilization determination section (55, 56).

The first current acquiring section acquires a first current detection value from a first current sensor (12) provided in a first phase of the AC motor. The second current acquiring section acquires a second current detection value from a second current sensor (14) provided in a second phase of the AC motor. The third current acquiring section acquires a third current detection value, which is used for monitoring an abnormality of the first current detection value and the second current detection value, from a third current sensor (13, 15). The rotation angle acquiring section acquires a rotation angle detection value from a rotation angle sensor (16), which detects a rotation angle of the AC motor.

The two-phase control current value calculating section calculates a two-phase control current value based on the first current detection value, the second current detection value, and the rotation angle detection value.

The one-phase control current value calculating section calculates a one-phase control current value based on either of the first current detection value and the second current detection value, and the rotation angle detection value.

The abnormality monitoring section monitors occurrence of an abnormality in the first current detection value, and the second current detection value, and the third current detection value to specify an abnormal phase, in which the abnormality has occurred, and a normal phase, in which no abnormality has occurred.

The switching section selects the two-phase control current value or the one-phase control current value as a current fixing value depending on whether the first current detection value, and the second current detection value, and the third current detection value are normal or not.

The voltage command value calculating section calculates a voltage command value associated with voltage to be applied to the AC motor based on the current fixing value and a command value associated with driving of the AC motor.

The stabilization determination section determines whether or not the current supplied to the AC motor has been stabilized, after the abnormality is detected in part of the first current detection value, and the second current detection value, and the third current detection value.

The switching section selects the two-phase control current value as the current fixing value when the first current detection value, and the second current detection value, and the third current detection value are normal. In addition, the switching section selects the one-phase control current value, which is calculated based on a normal phase current detection value, which is a value of the normal phase and is one of the first current detection value and the second current detection value, as the current fixing value, when the stabilization determination section determines that the current supplied to the AC motor has been stabilized after an abnormality is detected in part of the first current detection value, and the second current detection value, and the third current detection value.

In the embodiment, two-phase control is switched to one-phase control when the current supplied to the AC motor is stabilized after an abnormality is detected in part of the current detection value. Accordingly, the current detection value used for one-phase control can be continuously subjected to abnormality monitoring on the basis of a different normal current detection value. Thus, the AC motor can be continuously controlled without lowering the abnormality monitoring performance.

In the event that an abnormality has occurred in part of the current detection values, the abnormal current detection value is temporarily used for the calculation of the voltage command values. In this case, there is a concern that control becomes unstable and other current detection values also become unstable. In this regard, in the embodiment, the stabilization control for stabilizing current is performed instead of the control using the current detection values, until the stabilization of the current supplied to the AC motor is confirmed.

In this way, control is prevented from becoming unstable due to the use of the unstable current detection value for the calculation of the voltage commands. Thus, control is stably shifted to one-phase control.

It should be noted that the "state where the current passed through the AC motor is stable" includes not only the state where cyclic three-phase alternating current is supplied, but also a state where the current values are zero.

What is claimed is:

1. A control apparatus for an AC motor, the control apparatus controlling driving of a polyphase AC motor in which applied voltage is controlled by an inverter, the apparatus comprising:
    a first current acquiring section which acquires a first current detection value from a first current sensor provided in a first phase of the AC motor;
    a second current acquiring section which acquires a second current detection value from a second current sensor provided in a second phase of the AC motor;
    a rotation angle acquiring section which acquires a rotation angle detection value from a rotation angle sensor, which detects a rotation angle of the AC motor;
    a two-phase control current value calculating section which calculates a two-phase control current value based on the first current detection value, the second current detection value, and the rotation angle detection value;
    an one-phase control current value calculating section which calculates an one-phase control current value based on either of the first current detection value and the second current detection value, and the rotation angle detection value;
    an abnormality monitoring section which monitors occurrence of an abnormality in the first current detection value and the second current detection value to specify an abnormal phase, in which the abnormality has occurred, and a normal phase, in which no abnormality has occurred;
    a switching section which selects the two-phase control current value or the one-phase control current value as a current fixing value depending on whether the first current detection value and the second current detection value are normal or not;
    a voltage command value calculating section which calculates a voltage command value associated with voltage to be applied to the AC motor based on the current fixing value and a command value associated with driving of the AC motor;
    a drive control section which generates a drive signal associated with drive control of the inverter based on the voltage command value, and outputs the drive signal to the inverter;
    a stabilization control section which stabilizes current supplied to the AC motor, when an abnormality is detected in part of the first current detection value and the second current detection value; and
    a stabilization determination section which determines whether or not the current supplied to the AC motor has been stabilized, after the abnormality is detected in part of the first current detection value and the second current detection value, wherein
    the switching section selects the two-phase control current value as the current fixing value when the first current detection value and the second current detection value are normal, and
    the switching section selects the one-phase control current value, which is calculated based on a normal phase current detection value, which is a value of the normal phase and is one of the first current detection value and the second current detection value, as the current fixing value, when the stabilization determination section determines that the current supplied to the AC motor has been stabilized after an abnormality is detected in part of the first current detection value and the second current detection value.

2. The apparatus according to claim 1, wherein
the stabilization determination section determines that the current supplied to the AC motor has been stabilized, if an integrated value of a period is within a determination range that includes zero, the period corresponding to an integral multiple of a current cycle of the normal phase current detection value.

3. The apparatus according to claim 1, wherein
the stabilization determination section determines that the current supplied to the AC motor has been stabilized, if a difference between a current-time cyclic value and a previous-time cyclic value is equal to or less than a first determination threshold, the current-time cyclic value being the normal phase current detection value of a current cycle of current time, and the previous-time cyclic value being the normal phase current detection value at timing corresponding to the current-time cyclic value of the current cycle of previous time.

4. The apparatus according to claim 1, wherein
the stabilization determination section determines that the current supplied to the AC motor has been stabilized, if an amplitude of the normal phase current detection value is equal to or less than a second determination threshold.

5. The apparatus according to claim 1, wherein
the stabilization determination section determines that the current supplied to the AC motor has been stabilized, if an error between a current command value of the normal phase and the normal phase current detection value is equal to or less than a third determination threshold.

6. The apparatus according to claim 1, wherein
the stabilization determination section determines that the current supplied to the AC motor has been stabilized, if an error between a normal phase current calculation value and the normal phase current detection value is equal to or less than a fourth determination threshold, the normal phase current calculation value being a current value of the normal phase calculated using theoretical formulas of a motor.

7. The apparatus according to claim 1, wherein
the stabilization control section shuts down the inverter.

8. The apparatus according to claim 1, wherein
the voltage command value calculating section calculates the voltage command value based on the fed back current fixing value and a current command value serving as the command value.

9. The apparatus according to claim 1, further comprising a torque estimating section which calculates a torque estimate value based on the current fixing value, wherein
    the voltage command value calculating section calculates the voltage command value based on the fed back torque estimate value and a torque command value serving as the command value.

10. The apparatus according to claim 1, further comprising a torque estimating section which calculates a torque estimate value based on the current fixing value, wherein the voltage command value calculating section switches between a current feedback control process, in which the voltage command value is calculated based on the fed back current fixing value and a current command value serving as the command value, and a torque feedback control process, in which the voltage command value is calculated based on the fed back torque estimate value and a torque command value serving as the command value.

* * * * *